(12) United States Patent
BaderEddin

(10) Patent No.: US 11,023,102 B2
(45) Date of Patent: *Jun. 1, 2021

(54) DIGITAL EXPERIENCES USING TOUCHPOINT-BASED PROMPTS

(71) Applicant: Qualtrics, LLC, Provo, UT (US)

(72) Inventor: Ali BaderEddin, Kenmore, WA (US)

(73) Assignee: QUALTRICS, LLC, Provo, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/701,023

(22) Filed: Dec. 2, 2019

(65) Prior Publication Data

US 2020/0218405 A1    Jul. 9, 2020

Related U.S. Application Data

(63) Continuation of application No. 15/955,003, filed on Apr. 17, 2018, now Pat. No. 10,496,247.

(51) Int. Cl.
| | | |
|---|---|---|
| *G06F 3/048* | (2013.01) | |
| *G06F 3/0482* | (2013.01) | |
| *G06F 3/0488* | (2013.01) | |

(52) U.S. Cl.
CPC ........ *G06F 3/0482* (2013.01); *G06F 3/04883* (2013.01)

(58) Field of Classification Search
CPC .. G06F 3/0481; G06F 3/0482; G06F 3/04883; G06F 3/04812; G06Q 30/02
See application file for complete search history.

(56) References Cited

U.S. PATENT DOCUMENTS

| | | | |
|---|---|---|---|
| 8,255,836 B1* | 8/2012 | Gildfind | G06F 3/04883 715/863 |
| 10,496,247 B2 | 12/2019 | BaderEddin | |
| 2006/0026655 A1* | 2/2006 | Perez | H04N 21/26225 725/91 |
| 2013/0014136 A1* | 1/2013 | Bhatia | H04N 21/4222 725/9 |
| 2014/0143655 A1* | 5/2014 | Alon | G06Q 30/0202 715/234 |
| 2016/0219340 A1* | 7/2016 | Perez | H04N 21/4753 |

OTHER PUBLICATIONS

U.S. Appl. No. 15/955,003, filed Mar. 1, 2019, Office Action.
U.S. Appl. No. 15/955,003, filed Jul. 29, 2019, Notice of Allowance.

* cited by examiner

*Primary Examiner* — Haoshian Shih
(74) *Attorney, Agent, or Firm* — Keller Jolley Preece

(57) ABSTRACT

The present disclosure relates to a digital experience system that non-intrusively obtains valuable user feedback by strategically prompting users for feedback during a user's journey of a digital content experience. For example, in one or more embodiments, the digital experience system detects when various discrete touchpoints are triggered throughout a user's journey. In response to detection a triggered touchpoint, the digital experience system can provide the user with a prompt from a template of prompts. In this manner, the digital experience system can receive valuable and meaningful feedback from users without disrupting the user's digital content experience. Indeed, the digital experience system enhances the content experience for the user by providing prompts to the user throughout the user's journey of the content experience.

20 Claims, 18 Drawing Sheets

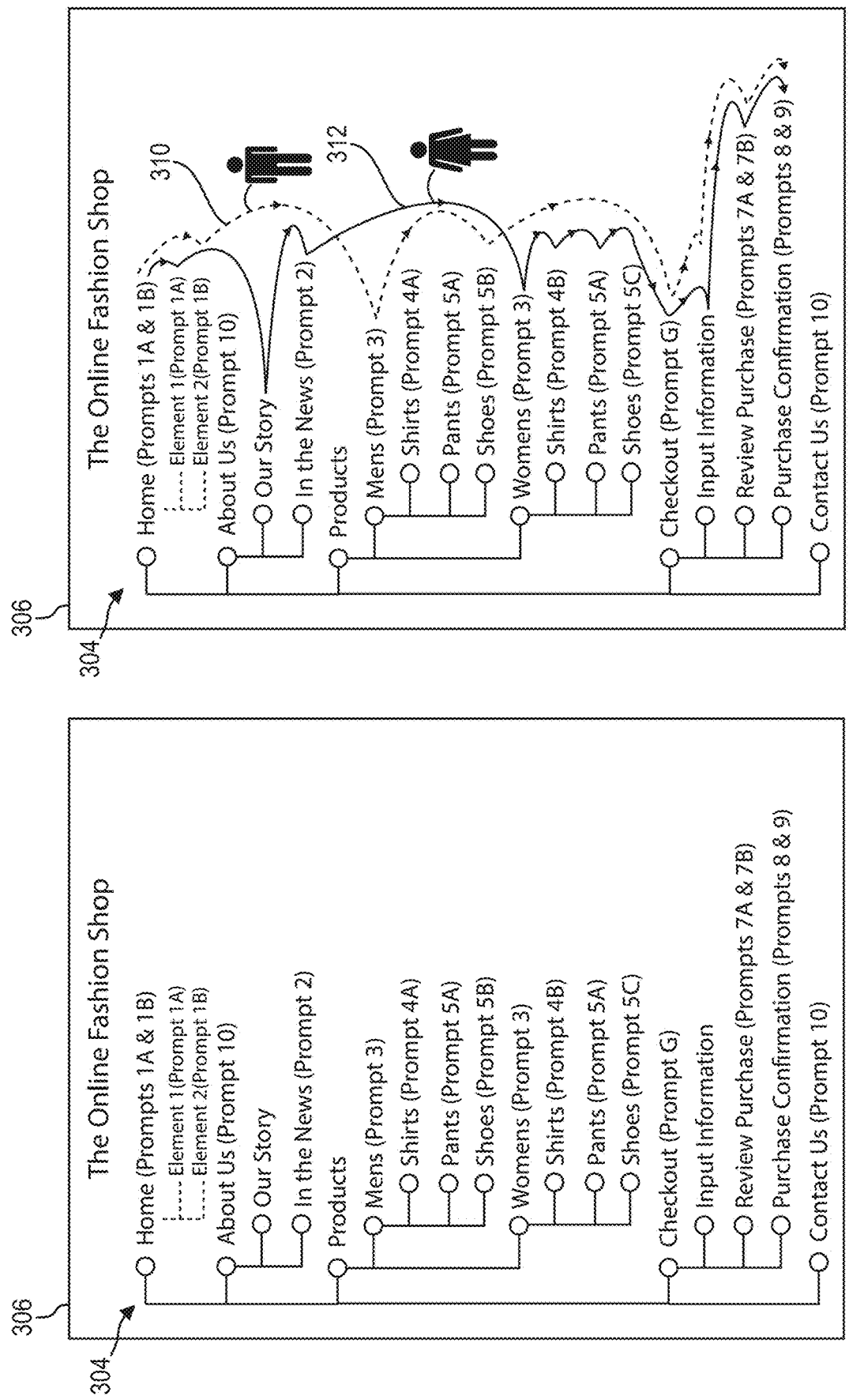

DIGITAL EXPERIENCES USING TOUCHPOINT-BASED PROMPTS

CROSS-REFERENCE TO RELATED APPLICATIONS

The present application is a continuation of U.S. application Ser. No. 15/955,003, filed on Apr. 17, 2018. The aforementioned application is hereby incorporated by reference in its entirety.

BACKGROUND

The recent rise and availability of improved computing devices has enabled individuals to access digital content with greater ease than ever before. Indeed, it is common for individuals to use computing devices to access websites, applications, and other forms of digital content. Often, modern computing devices are portable and enable individuals to access and experience digital content in virtually any environment.

With access and availability to digital content increasing, digital content providers are constantly attempting to provide updated digital content to individuals along with improved products and services. Commonly, digital content providers rely on feedback to identify areas of improvement to enhance an individual's digital experience. While individuals often provide feedback through customer reviews, product ratings, and other forms of unstructured feedback, digital content providers frequently rely on structured forms of feedback (e.g., electronic surveys) to identify targeted feedback to improve specific aspects of an individual's digital experience. However, conventional systems of providing structured forms of feedback present several disadvantages to both individuals and the digital content providers.

To illustrate, one conventional system includes a digital content provider displaying a list of questions to an individual near the end of the individual's content experience (e.g., after purchasing a product). For example, the digital content provider displays a list of questions in a modal window and requests the individual provide answers to the list of questions, even if one or more questions are not relevant to the individual's experience. Upon seeing the long list of questions, the individual often dismisses the list without answering any of the questions, as answering the questions would require too much of the individual's time.

Another conventional system includes a digital content provider supplying an electronic survey link to an individual, and the individual agreeing to provide feedback by selecting the link. As the electronic survey is administered, the individual often becomes bored, impatient, and/or anxious as completing the entire survey takes more time than anticipated. As a result, many individuals prematurely quit the electronic survey, which results in one or more questions remaining unanswered—often including some of the more valuable survey questions. Alternatively, the individual completes the survey, but the answers become brief and/or superficial as the individual's incentives to fully answer questions diminish over time (i.e., survey fatigue sets in). Survey fatigue can lead to less valuable or flawed and misleading response data.

As another disadvantage, conventional methods provide little or no feedback to individuals in return for their time and effort. At most, some digital content providers enable an individual to view the results of questions across answers from multiple individuals, but digital content providers do not indicate whether or how any of the feedback provided by an individual is being considered or implemented. Thus, individuals become less likely to provide their feedback to current and future questions.

Furthermore, conventional systems do not flexibly adapt well to the multiple types of client devices that an individual may use to access digital content. For example, conventional systems employ inefficient graphical user interfaces when providing electronic surveys to a client device with a small screen, such as a smartphone. In particular, conventional systems require often break a list of questions into smaller sections to better accommodate smaller screen sizes. In doing so, however, conventional systems further increase the number of graphical user interfaces needed to navigate to the end of an electronic survey increases, causing the individual to drill down through additional layers (e.g., beyond that of an already lengthy electronic survey) to complete the electronic survey. Indeed, with respect to client devices with smaller screens, conventional systems increase the complexity, difficulty, and time needed to complete an electronic survey.

In addition, conventional systems provide intrusive graphical user interfaces that distract from a digital content experience of the user. Indeed, conventional survey graphical user interfaces often consume the majority of screen space and thus block the user from continuing to enjoy a content experience. In other words, conventional graphical user interfaces force the survey participation of a user to be separate from the content experience, meaning, the user must stop the content experience in order to participate in the electronic survey. Thus, conventional systems provide inefficient graphical user interfaces that distract of an experience of a user.

Overall, conventional methods to petition individuals for targeted feedback are ineffective and inefficient. Besides resulting in missing information, incomplete survey answers, low-quality response data, and/or possible false data, conventional methods also waste computing and memory resources. For example, by serving a list of questions that result in individuals ignoring the questions, conventional methods waste both processing and memory resources. Additionally, when individuals provide incorrect or false answers to more quickly complete a survey, the processing and memory resources used to provide, store, and analyze these answers are wasted. Further, additional processing resources are needed to attempt to identify, flag, and remove false answers.

Accordingly, these and other problems exist with regard to conventional methods for gathering feedback from individuals with respect to improving content experiences.

SUMMARY

Embodiments of the present disclosure provide benefits and/or solve one or more of the foregoing or other problems in the art with systems, computer media, and methods for selectively obtaining user feedback throughout a user's journey through a digital content experience. For example, one or more embodiments of a disclosed system provide an improved user interface experience that provides prompts to users at various touchpoints throughout a digital content experience. Indeed, the system generates and provides custom prompts (e.g., electronic survey questions) based on monitoring a user's journey through a digital content experience and detecting that the user interacts with one or more separately triggered touchpoints within the digital content experience. In this manner, the prompts become part of the content experience itself, resulting in a seamless and efficient user interface experience that effectively requests and collects valuable and reliable user feedback data.

For example, the system can monitor a user's navigation path through the content experience where the navigational path includes user interactions with the content experience. Based on the navigational path of the user, the system can identify multiple discrete touchpoints throughout the content experience that were separately triggered by user interactions. In addition, the system can determine one or more prompts to provide to a user for each of the separately triggered multiple discrete touchpoints. Furthermore, the system can receive a user response to the prompts and perform various actions based on the user's response.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description describes one or more embodiments with additional specificity and detail through the use of the accompanying drawings, as briefly described below.

FIGS. 3A and 3B illustrate an example structure of a content experience and respondents navigating through the content experience in accordance with one or more embodiments.

DETAILED DESCRIPTION

Figure 1:
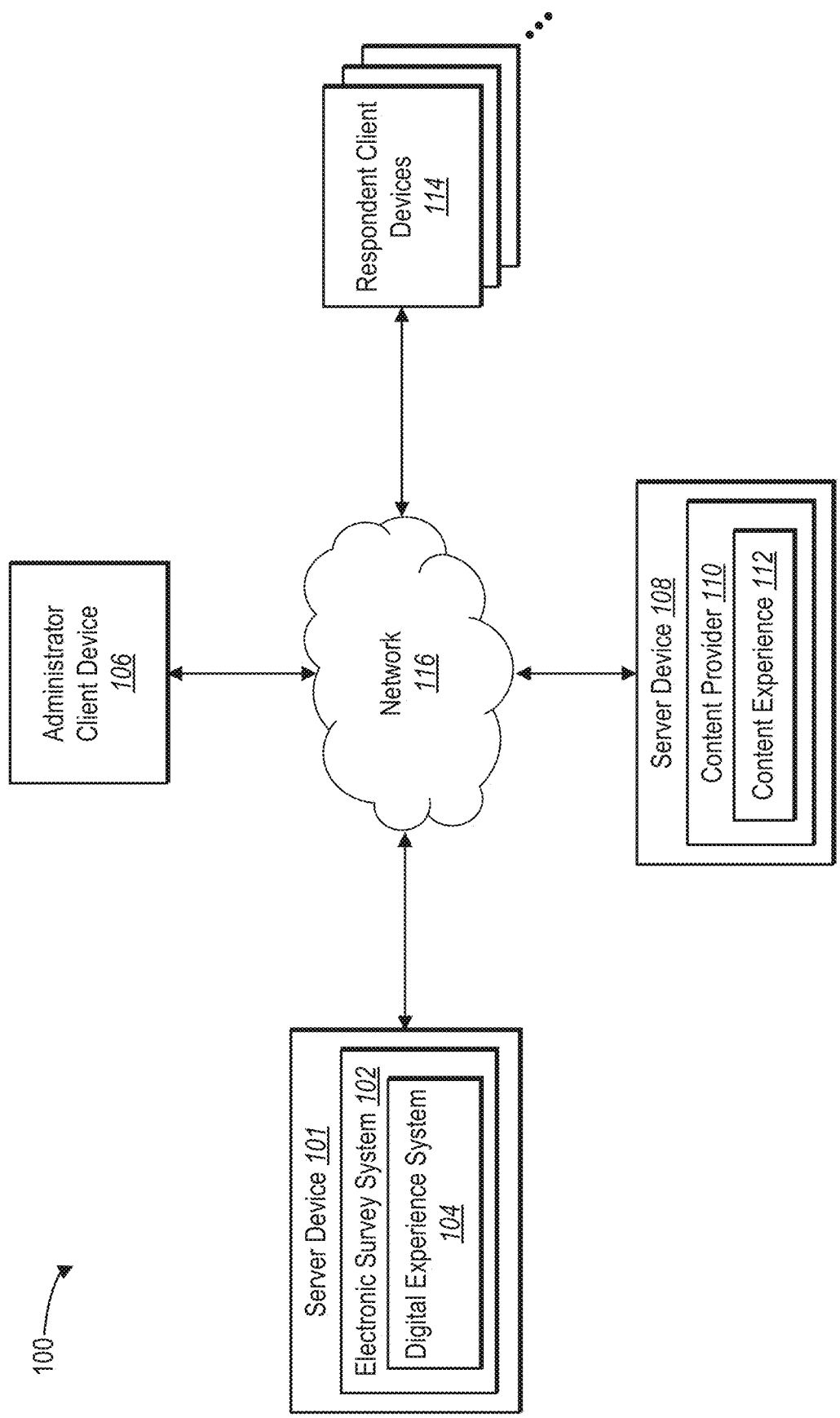
FIG. 1 illustrates a schematic of an exemplary environment in which a digital experience system may be implemented in accordance with one or more embodiments.

This disclosure describes one or more embodiments of a digital experience system that non-intrusively obtains valuable user feedback that provides an efficient user experience interface that strategically prompts users for feedback based on a user's journey through a digital content experience. For example, in one or more embodiments, the digital experience system detects when various discrete touchpoints (e.g., user interactions associated with the digital content experience) are triggered throughout a user's journey, and in response to detecting a triggered touchpoint, the digital experience system provides the user with a prompt. In this manner, the digital experience system provides an improved graphical user interface that can quickly and efficiently receive valuable and meaningful feedback from users without disrupting the user's digital content experience, which, in turn, leads to a reduction in computational resources and memory requirements, as further detailed below.

In one or more embodiments, the digital experience system monitors a user's navigational path through a content experience (e.g., a user browsing a website or interacting with an application) including user interactions with content within the content experience. For instance, the digital experience system identifies specific content with which the user engages (e.g., webpages, interfaces, commands, selections, and/or workflows) during a content experience. For example, the digital experience system can detect elements and objects with which a user interacts. Based on monitoring the user navigating through the content experience, the digital experience system identifies multiple discrete touchpoints separately triggered by the user while the user is navigating throughout the content experience.

Based on the user triggering one of the multiple discrete touchpoints, in one or more embodiments, the digital experience system provides a prompt (e.g., an electronic survey question) to a user. For instance, the digital experience system determines a prompt from a template of prompts corresponding to a touchpoint. Then, in response to detecting the user triggering the touchpoint, the digital experience system provides a corresponding prompt to the user within the content experience. Later, when a second touchpoint is triggered, the digital experience system can provide a second corresponding prompt to the user. For each provided prompt, the digital experience system can receive a response from the user, which the digital experience system can store and/or organize for future analysis.

As mentioned above, the digital experience system provides prompts to a user based on the user's journey (i.e., navigational path) through the content experience. Because the digital experience system provides prompts based on touchpoints triggered by the user, the digital experience system often provides less than all of the prompts in the template of prompts. Indeed, a user's navigational path may cause the digital experience system to provide only a subset of prompts from the template of prompts to the user during their content experience. Accordingly, the digital experience system provides a number of prompts that is proportional to the user's content experience rather than overburdening the user with a full set of survey questions as with most conventional systems.

In addition to providing prompts based on detecting a user interaction with one or more touchpoints, the digital experience system can modify the content experience based on one or more received responses to prompts. For example, one or more users can provide feedback regarding a potential improvement they would like to see changed regarding the content experience. Based on the feedback, the digital experience system updates the content experience. Further, in various embodiments, the digital experience system provides notifications to those users regarding the updates to the content experience on a subsequent visit by the user to the content experience. Additionally, or alternatively, the digital experience system provides notifications to the users via other media channels regarding the updated content experience. In this manner, users of the content experience receive validation for the feedback they provide.

As also mentioned above, users can trigger multiple discrete touchpoints throughout their content experience. In some embodiments, touchpoints are linked to graphical elements or interface features, such as text, images, or selectable options. In addition, touchpoints can be associated with an interface, a document page, or portions thereof.

As mentioned above, the digital experience system can associate a prompt to a touchpoint from a template of prompts (e.g., list of survey questions). For example, the digital experience system generates and/or receives a list of prompts to provide to a user in connection with the digital experience. For some or all of the touchpoints within the content experience, the digital experience system can assign a prompt from the prompt template. In some cases, the digital experience system can also aggregate and analyze touchpoint interactions within the content experience to determine prevalent navigational patterns and element interactions. Based on the patterns and interactions, the digital experience system can determine which prompts to assign to which touchpoints.

In some embodiments, the digital experience system can also assign trigger conditions to one or more touchpoints. For example, the digital experience system prevents the same prompt from being provided twice to a user during the content experience. As an additional example, the digital experience system determines not to provide a prompt unless a prerequisite prompt has previously been asked. As another example, the digital experience system ensures that an amount of time has elapsed since providing a previous prompt before providing a next prompt. In some embodiments, the digital experience system conditions a touchpoint trigger based on other touchpoints being previously interacted with or triggered. In addition, in one or more embodiments, the digital experience system can assign the same prompt in the template of prompts to multiple touchpoints within a content experience. In this manner, the digital experience system can provide the same prompt to users of the content experience that trigger different touchpoints. Additional examples of trigger conditions are provided below.

In various embodiments, the digital experience system assigns multiple prompts to the same touchpoint. For example, a touchpoint is associated with a primary prompt and a secondary prompt. Similarly, the digital experience system can determine which version of a prompt touchpoint (e.g., multiple-choice) and/or which delivery method (e.g., pop-up bubble) to employ when providing the prompt to the user. Indeed, the digital experience system can determine which prompt, prompt version, and/or delivery method to provide to a user for a triggered touchpoint based on the user's interaction with the touchpoint and/or the user's navigational path.

In addition to providing a prompt based on a user's journey through, and interaction with, a content experience, the digital experience system can customize a prompt based on metadata associated with the interacting user. For instance, if a user profile indicates that a user prefers a particular version or delivery method of a prompt, the digital experience system may select that version or delivery method of the prompt, if available, for a corresponding triggered touchpoint. Alternatively, based on metadata associated with the user, the digital content experience system can refrain from providing a prompt associated with a triggered touchpoint to some users, while providing the prompt to other users.

In some embodiments, the digital experience system can provide prompts from a template of prompts across multiple content experiences. For example, the digital experience system provides prompts from the prompt template across multiple user visits (e.g., sessions) to the content experience. In some embodiments, the digital experience system provides the prompts for the same content experience across different media channels (e.g., via a website and mobile application that provide the content experience). In one or more embodiments, the digital experience system provides prompts to users across different content experiences (e.g., if the prompts are content-agnostic such as advertisements that appear on multiple content experiences).

The digital experience system provides many advantages and benefits over conventional systems and methods. For example, the digital experience system overcomes the problem of inefficiently and ineffectively bogging down users with a list of questions (i.e., prompts) all at once that can cause users to ignore the questions altogether or provide inaccurate responses. Instead, the digital experience system provides a user experience and graphical user interface features that integrate and blend prompts into the content experience such that users naturally, efficiently, and accurately interact with the prompts as part of the content experience. In addition, the digital experience system provides a proportional number of prompts to users based on the amount of interaction with the content experience and trigger touchpoints. As a result, and in contrast to conventional systems, the digital experience system allows a user to more efficiently provide accurate feedback by streamlining the user's interaction with prompts throughout the user's journey.

Moreover, as a further benefit, the digital experience system flexibly adapts to various types of client devices, especially client devices with small screens. For instance, because the digital experience system provides strategy prompts when a user triggers a discrete touchpoint, the individual prompt often fits well within a small screen size. Additionally, as described below, because part of triggering a discrete touchpoint can include detecting data about the type of client device through which the touchpoint is triggered, the digital experience system provides the prompt to the client device in a graphical user interface particular to the client device (e.g., a small screen specific prompt). Indeed, the digital experience system provides a minimalist graphical user interface format that breaks apart a collective digital experience into discrete touchpoints, which lends particularly well to client devices with small screens.

In addition, regardless of the type of client device, the digital experience system provides a graphical user interface that reduces the number of steps a user needs to provide meaningful feedback, which reduces the overall process of obtaining feedback by eliminating prompts that are not relevant for a user. In particular, the digital experience system improves the efficiency and speed of the user using a client device by identifying only relevant prompts from a list of prompts, strategically providing the most relevant prompts directly to the user in a timely manner in response to user action triggering a touchpoint, and enabling the user to quickly answer and resolve the prompt—often with a single interaction. Thus, the user need not navigate and drill down through numerous interfaces and irrelevant data to provide feedback or receive assistance. Moreover, the digital content experience system provides graphical user interface elements that allow a user to provide valuable feedback to an electronic survey while continuously viewing a digital content experience.

As an additional benefit, the digital experience system can provide feedback to users based on user responses. For example, the digital experience system implements changes to the content experience based on feedback of a user's response. The digital experience system can then notify the user of the implemented change based on the user's feedback. Furthermore, when the digital experience system modifies the content experience based on multiple users providing the same feedback, the digital experience system can consolidate the feedback to a single actionable item (e.g., a customer service ticket). In this manner, the digital experience system closes the experience gap with the user, which increases user satisfaction and inspires the user to provide further valuable feedback. Moreover, consolidating actionable items enables the digital experience system to reduce computational processing and save memory by grouping multiple actionable items together.

As mentioned above, the digital experience system generally provides a subset of prompts to a user within the content experience by only providing relevant prompts from a template of prompts as the user interacts with the content experience. As a result, less overall prompts are provided, which leads to computational, communication bandwidth, and storage savings. Further, by providing relevant prompts to a user, the number of erroneous or false responses decrease, which results in reducing computational processing and storage waste caused by having to process and/or attempt to identify false responses.

In addition, the digital experience system provides increased flexibility. For example, as a user journeys through a content experience, the digital experience system determines whether to provide a particular prompt or a particular prompt version to the user in response to a user interaction with a touchpoint, or which delivery method to employ in providing the prompt, as mentioned above. In this manner, the digital experience system flexibly adapts to dynamically providing prompts to a user throughout the content experience.

Referring now to the figures, FIG. 1 illustrates a schematic diagram of an environment 100 in which a digital experience system 104 may be implemented in accordance with one or more embodiments. As illustrated, the environment 100 includes a server device 101 that hosts an electronic survey system 102 (or simply "survey system 102") and a digital experience system 104, an administrator client device 106 (associated with an administrator user or simply "administrator"), a server device 108 that hosts a content provider 110 including a content experience 112, and respondent client devices 114 (associated with corresponding users or respondents). As shown in FIG. 1, each computing device is connected via a network 116. Additional details regarding the various computing devices (e.g., the server devices 101 and 108, the administrator client device 106, and respondent client devices 114) and networks (e.g., network 116) are explained below with respect to FIGS. 11 and 12.

As illustrated in FIG. 1, the environment 100 includes the server device 101 that hosts the survey system 102 and the digital experience system 104. In general, the survey system 102 facilitates the creation, administration, and analysis of electronic surveys. For example, the survey system 102 enables an administrator, via the administrator client device 106, to create, modify, and run a digital survey that includes various prompts (e.g., electronic survey questions). In addition, the survey system 102 provides electronic survey prompts to, and collects responses from, respondents via the respondent client devices 114.

As shown, the survey system 102 includes the digital experience system 104. For example, the digital experience system 104 further facilitates the distribution of survey prompts to the respondent client devices 114 within the content experience 112 provided by the content provider 110. As further described below, the digital experience system 104 provides a prompt from a template of prompts to a respondent client device when a corresponding respondent triggers a touchpoint within the content experience 112. Further, the digital experience system 104 can receive a response from the respondent client device and provide the response to the survey system 102.

In some embodiments, the digital experience system 104 is separate from the survey system 102. In one example, the digital experience system 104 and the survey system 102 are separately located on the server device 101. In another example, the digital experience system 104 is located on a separate server device than the survey system 102. In various embodiments, the environment 100 includes the digital experience system 104 and does not include the survey system 102.

As mentioned above, the environment 100 includes a content provider 110 that provides a content experience 112. For instance, the content experience 112 is a website, mobile application, electronic message, or other type of digital media or content with which a respondent can interact. In addition, the content provider 110 can host the content experience 112 and/or design and distribute the content experience 112 (e.g., via download) to the respondent client devices 114.

Although FIG. 1 illustrates a particular arrangement of the server devices 101, 108, administrator client device 106, respondent client devices 114, and network 116, various additional arrangements are possible. For example, the administrator client device 106 can directly communicate with the server device 101 hosting the digital experience system 104, bypassing the network 116. As another example, the administrator client device 106 can directly communicate with the server device 108 hosting the content provider 110. Further, while only one administrator client device 106 is illustrated, the environment 100 can include any number of administrator client devices. Similarly, as shown, the environment 100 can include any number of respondent client devices 114.

As illustrated by the foregoing discussion, the present disclosure utilizes a variety of terms to describe features and advantages of the digital experience system. For reference, additional detail is now provided regarding the use of these terms. For example, as used herein, the term "prompt" refers to an electronic communication used to collect information. In particular, the term "prompt" can include an electronic communication that causes a client device to present a digital query that invokes or otherwise invites a responsive interaction from a respondent of a respondent client device (e.g., one of the respondent client devices 114). For instance, a prompt can include an electronic survey question.

As used herein, the term "prompt version" (or "version") refers two or more different forms of a prompt that invoke the same or similar response data. For example, the response data for a prompt appears uniform among respondents even when the digital experience system 104 provides different versions for the prompt to respondents. A version of a prompt can refer to a question type, such as a multiple-choice, open-ended, free-form, ranking, scoring, summation, demographic, dichotomous, differential, cumulative, dropdown, matrix, net promoter score (NPS), single textbox, heat map, text, or graphic. A version of a prompt may change the appearance of a prompt, such as the style, format, font, size, color, spacing, or graphical user interface display) of a prompt. Versions can be based on a number of factors, such as profile data (e.g., age, gender, or cultural background), locational information, client device type (e.g., smartphone, tablet, laptop, or desktop) of a respondent. Additional examples of multiple versions of a prompt are described below as well as shown in the figures.

As used herein, the term "template of prompts" refers to a set of prompts that correspond to a given electronic survey. In particular, the term "template of prompts" refers to a digital collection of one or more electronic survey prompts belonging to an electronic survey. In one or more embodiments, a template of prompts is stored as a digital file or files on a survey database (e.g., within the electronic survey system 101). The digital experience system 104 can associate prompts from a template of prompts to discrete touchpoints within the content experience 112 such that a respondent responds to some or all of the prompts in a template of prompts at based on triggering different touchpoints throughout the content experience 112.

As used herein, the term "response" refers to electronic data provided in response to a prompt. The electronic data may include content and/or feedback based on user input from the respondent in response to a prompt. Depending on the prompt version, the response may include, but is not limited to, a selection, a text input, an indication of an answer selection, an image or map selection, a user-provided answer, and/or an attachment. For example, a response to an opened-ended prompt can include free-form text (i.e., a text response).

The term "content experience" refers to a collection of digital interfaces with which a respondent can interact. In particular, the term "content experience" refers to digital interfaces that include one or more touchpoints. In some embodiments, a content experience is a single interface with one or more touchpoints. Examples of a content experience include, but are not limited to, websites having one or more web pages, mobile applications that include one or more interfaces, electronic messages, interactive digital media, and other user-interactive interfaces. A content provider (e.g., content provider 110) can provide a content experience to a respondent client device. In addition, a content provider can provide a content experience via a variety of Internet media channels (e.g., electronic messages, web browsers, and Internet-enabled applications).

The term "touchpoint," as used herein, refers to an interaction event between a respondent and a content experience. For example, a touchpoint can refer to a presentation of digital content (e.g., a webpage), and in addition, a touchpoint can refer to a graphical element within the presentation with which a respondent can interact. Examples of touchpoints include, but are not limited to, text, graphics, and interfaces, or portions thereof. A respondent can trigger a touchpoint when trigger conditions associated with the touchpoint are satisfied. Trigger conditions can include a click, touch, hover, linger, view, impression, activation, access request, entry, or exit. A trigger condition for a touchpoint can be independent, or alternatively, a condition for a touchpoint can be based on a combination of other touchpoints within a content experience. Additional examples of touchpoints and trigger conditions are provided below.

The term "user navigational path" (or simply "navigational path") refer to a respondent's interactions with a content experience. In one or more embodiments, a navigational path serves as a digital breadcrumb trail of a respondent's actions and interactions within a content experience. For example, the digital experience system 104 monitors which interfaces a respondent accesses and which touchpoints with which a respondent interacts. Additionally, or alternatively, a third-party can provide data with regard to a respondent's navigational path within and without (but associated with) a content experience. A navigational path can be stored in a hierarchical structure, list structure, or other data structure.

Figure 2A:
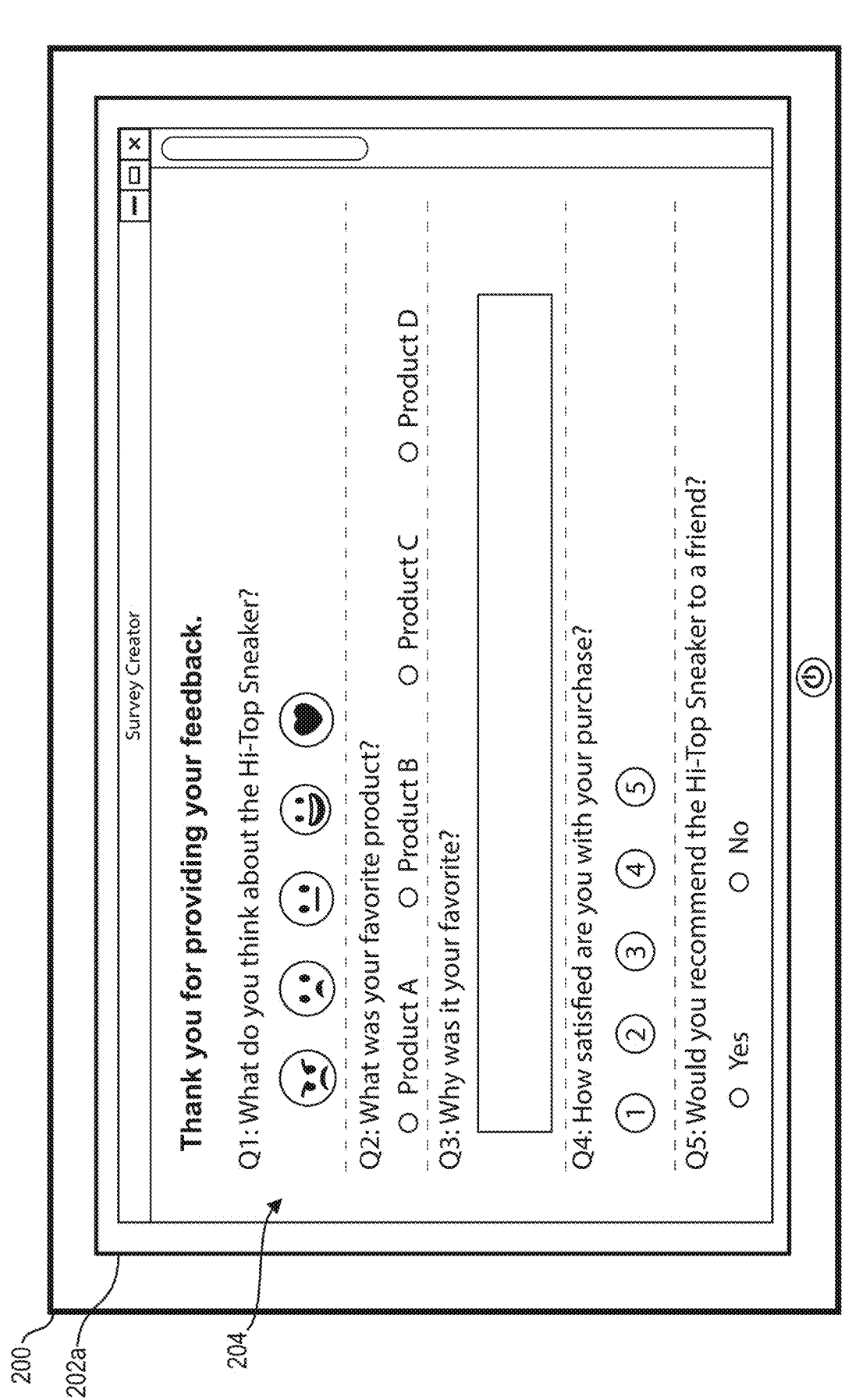
FIGS. 2A-2C illustrate examples of providing prompts to a respondent for a content experience in accordance with one or more embodiments.
Figure 2B:
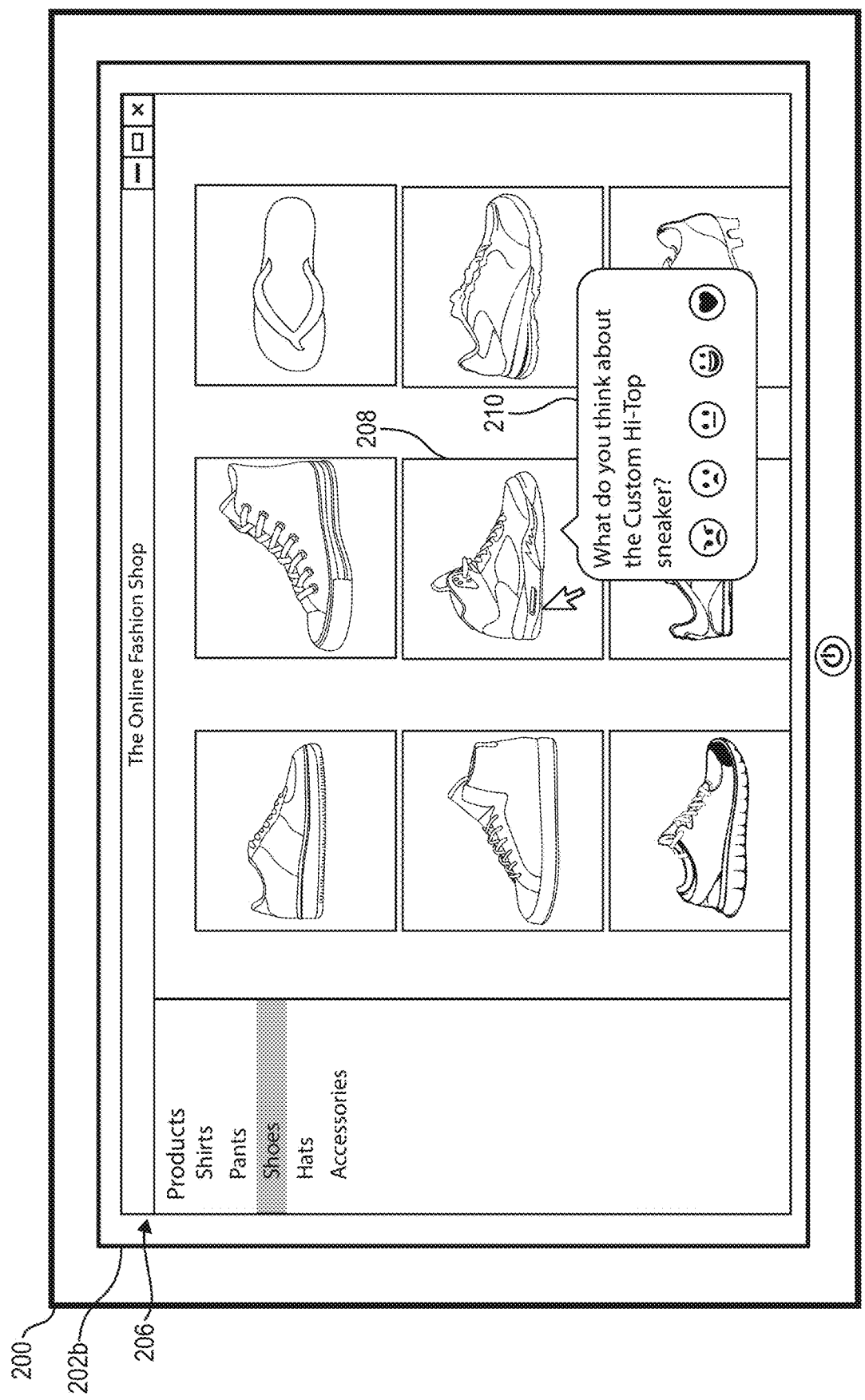
Figure 2C:
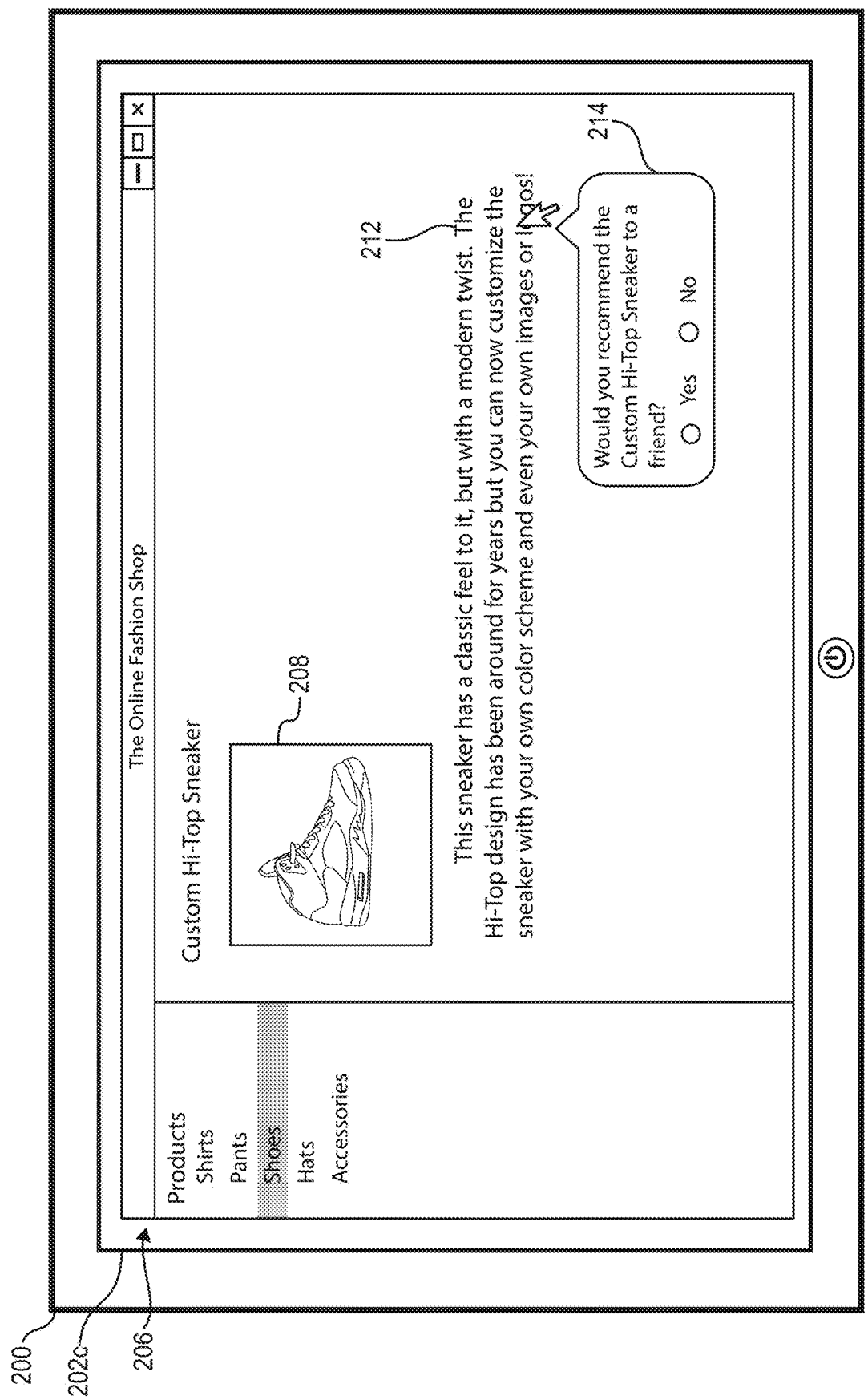

Turning now to FIGS. 2A-2C, a brief overview of the digital experience system 104 providing prompts based on triggered touchpoints is given. In particular, FIG. 2A illustrates a survey creator that an administrator user (e.g., a survey creator) employs to generate prompts. FIGS. 2B-2C illustrate examples of providing one or more prompts to a respondent for a content experience in accordance with one or more embodiments. As shown, each of FIGS. 2A-2C includes a respondent client device 200 (e.g., an administrator client device or a user client device) having a graphical user interface that displays one or more prompts. More specifically, FIG. 2A shows a first graphical user interface 202*a*, FIG. 2B shows a second graphical user interface 202*b*, and FIG. 2C shows a third graphical user interface 202*c*.

As mentioned above, a survey system (e.g., the electronic survey system 102) provides a template of prompts to a respondent to evaluate the respondent's experience with a content experience. For example, FIG. 2A shows a survey creator having a template of prompts 204 that an administrator desires the survey system to provide to a respondent upon the respondent interacting with the content experience. In addition, the survey creator can suggest, and/or the administrator can specify, discrete touchpoints associated with each prompt in the template of prompts. In some instances, the template of prompts 204 includes more prompts than can be displayed at one time within the display of the respondent client device 200.

Upon creating the template of prompts 204, the survey system can provide individual prompts to a respondent upon detecting the respondent trigging an associated discrete touchpoint. Before moving to FIGS. 2B-2C, which describe these embodiments, it is worth noting that conventional systems would provide the list prompts 204 to a respondent as a list of prompts in the order, manner, and format shown in the first graphical user interface 202*a*. Indeed, conventional systems provide respondents interacting with a content experience with the same number of prompts, in the same order, and often the same format. Further, conventional systems provide the list of prompts shown in FIG. 2A to respondents at the same time within the content experience (e.g., when respondents reached the end of the content experience).

As explained earlier, when a list of prompts is provided to respondents (e.g., the list of prompts shown in FIG. 2A), particularly when the respondents have finished the content experience, the respondents often do not complete the prompts in the template of prompts. Indeed, respondents ignore some or all of the prompts and/or do not put forth the necessary effort to provide valuable feedback. As a result, the survey system is left with fewer feedback responses, many of which include unreliable or flawed data.

To remedy these and other issues, the digital experience system 104 non-intrusively obtains valuable user feedback by strategically prompting users for feedback during a user's journey through a digital content experience. To illustrate, FIG. 2B shows the second graphical user interface 202b that includes a content experience 206 (i.e., "The Online Fashion Shop"). For instance, the content experience 206 is an online website that offers various products including shirts, pants, shoes, hats, and accessories.

In addition, the second graphical user interface 202b of FIG. 2B shows a respondent actively interacting with the content experience 206 (e.g., shown as a cursor hovering over or selecting a product image 208 via the respondent client device 200). The digital experience system 104 can associate elements within the content experience 206 (e.g., the product image 208) with a touchpoint such that when the user interacts with the product image 208 within the content experience 206, the touchpoint is triggered. Thus, as shown, the digital experience system 104 detects that the user interaction between the respondent and the product image 208 triggers the touchpoint associated with the product 208. The digital experience system 104 can also associate all of the other product images included within the content experience 206 with touchpoint that is particular to each specific product. Additional information regarding elements and touchpoints is provided below with respect to FIG. 5.

The digital experience system 104 (or the administrator) can assign a prompt from the template of prompts 204 to the touchpoint. Then, in response to detecting a touch point trigger (e.g., the respondent interacting with the product image 208, the digital experience system 104 provides a prompt corresponding to the touchpoint to the respondent client device. To illustrate, the second graphical user interface 202b shows a prompt 210 that asks the respondent about their opinion of the product (e.g. the shoe) with which the respondent is interacting. The prompt 210 is similar to the first prompt included in the template of prompts 204 of the survey creator shown in FIG. 2A. However, the digital experience system 104 modifies the prompt 210 to fit the respondent's current experience (e.g., not asking in past tense) while still invoking the same response data as the first prompt in the template of prompts 204.

Notably, the prompt 210 is shown in isolation of the other prompts from the template of prompts 204. In addition, the prompt is provided in response to the respondent interacting with the content experience 206 rather than after the respondent has left or finished the content experience 206. Further, once the respondent provides a response to the prompt 210, the digital experience system 104 can collect the response and allow the respondent to continue interacting with the content experience 206.

As the respondent continues to interact with the content experience 206, the digital experience system 104 can detect other triggered touchpoints. In response, the digital experience system 104 can provide additional prompts from the template of prompts 204 to the respondent. To illustrate, FIG. 2C shows the third graphical user interface 202c of a product page for the product (e.g., the respondent selects the product 208 and a content provider displays the product page within the third graphical user interface 202c). As the respondent interacts with elements within the third graphical user interface 202c, the digital experience system 104 detects another triggered touchpoint. For instance, the digital experience system 104 detects that the respondent has been reading the text description 212 on the product page for over a predefined length of time (e.g., 90 seconds). In response, the digital experience system 104 identifies and provides the additional prompt 214 to the respondent.

The additional prompt 214 corresponds to the last prompt shown in the template of prompts 204. Thus, the digital experience system 104 need not provide prompts to respondents in the order listed in the template of prompts 204 of the survey creator shown in FIG. 2A, but based on the respondent's navigational path within the content experience 206 and based on which touchpoints are triggered at which time. Furthermore, the digital experience system 104 can provide a number of prompts (e.g., a subset) from the template of prompts 204 based on the nature and/or duration of a respondent's interaction with the content experience 206 (e.g., which touchpoints were triggered). Indeed, in some embodiments, the digital experience system 104 provides a respondent with only a portion of prompts from the template of prompts 104 during the content experience.

Furthermore, as described below, the digital experience system 104 can customize the prompt, and subject matter of the prompt itself, based on data associated with the respondent. For example, based on how a touchpoint is triggered or the type of client device on which the touchpoint is triggered, the digital experience system 104 can determine which prompt version and graphical user interface to provide to the respondent. In another example, the digital experience system 104 determines which delivery method to employ based on user metadata associated with the respondent. Accordingly, the digital experience system 104 is not limited to providing the exact prompt shown in the template of prompts 204, but can flexibly customized prompts to better suit a respondent's navigation throughout the content experience.

Overall, the digital experience system 104 provides one or more prompts from the template of prompts 204 to respondents as part of the content experience 206 rather than as a separate occurrence. In this manner, the digital experience system 104 improves the efficiency and speed of the respondent using the client device 200 by identifying only relevant prompts from the template of prompts 204 and strategically providing the most relevant prompt directly to the respondent at the moment the respondent triggers a touchpoint. Also, the digital experience system 104 improves the efficiency of respondents using as the respondent need not navigate and drill down through numerous interfaces and irrelevant prompts (e.g., the entire list of prompts) to provide feedback or receive assistance. Indeed, because the digital experience system 104 provides prompts in response to user interaction, respondents will often provide more meaningful and valuable feedback, which benefits both content providers and respondents interacting with the content experience 206.

FIGS. 3A and 3B further illustrate how the digital experience system 104 provides prompts to respondents interacting with a content experience. In particular, FIG. 3A illustrates an example hierarchy structure 304 of a content experience in accordance with one or more embodiments. FIG. 3B illustrates the navigational path of different respondents as each respondent navigates through the content experience.

As mentioned, FIG. 3A shows a hierarchy structure 304 for a content experience 306 (i.e., The Online Fashion Shop). For purposes of explanation, the content experience 306 is shown as a website having multiple web pages, however, as described above, the content experience can include other types of media channels, such as a mobile application having various interfaces. In addition, while the content experience 306 shows web pages to view and purchase products offered by the content provider, one will appreciate that the principles disclosed herein apply to other types of content experiences (e.g., non-shopping content experiences, digital media experiences, application use, streaming services, and any other type of content experience).

In addition, each of the web pages within the content experience 306 can include multiple elements (e.g., document object model (DOM) elements including tags, text, links, images, etc.). As shown, the "Home" web page (i.e., "Homepage") lists two elements (i.e., Element 1 and Element 2). While not illustrated for simplicity, other web pages in the content experience 306 can likewise include elements. Similarly, the Homepage can include additional elements.

Both the web pages and elements within the web pages of the content experience 306 can include associated touchpoints, which are triggered based on user interaction. For instance, each web page within the content experience 306 includes one or more touchpoints that trigger when a respondent accesses the web page. In particular, the content provider detects when a respondent visits a given web page (e.g., the web page is triggered upon being accessed) and the content provider informs the digital experience system 104 of the web page and the respondent (e.g., using a respondent identifier). Based on digital experience system detecting that the web page is triggered, the digital experience system 104 can provide a prompt to the respondent, as described below.

In a similar manner, the digital experience system 104 can detect when interactions of respondents trigger touchpoints associated with elements within web pages of the content experience 306. For instance, the digital experience system 104 detects, via the content provider, a hover event or click event for an element within a web page of the content experience 306. A touchpoint can be triggered based on a variety of factors, as further described below in connection with FIG. 5.

As shown in the hierarchy structure 304 of the content experience 306, the digital experience system 104 can associate or assign a prompt to a web page or to one or more elements within a web page. Indeed, the hierarchy structure 304 illustrates various prompts assigned to a web page (or one or more elements within the web page). For instance, as shown, the digital experience system 104 assigns Prompts 1A and 1B to the Homepage, or more specifically, Prompt 1A to Element 1 and Prompt 1B to Element 2.

As mentioned previously, the digital experience system 104 assigns touchpoints to one or more prompts from a template of prompts. For example, the prompts shown in the hierarchy structure 304 of the content experience 306 can be selected from a template of prompts having ten prompts. For simplicity, each of the prompts included in the hierarchy structure 304 of the content experience 306 are associated with a single prompt. However, the digital experience system 104 can employ a different template of prompts or multiple templates when assigning prompts to touchpoints.

The digital experience system 104 can assign prompts to various touchpoints throughout the content experience 306. As shown, the prompts are not assigned in order from Prompt 1 to Prompt 10, but distributed throughout. As described further below, the digital experience system 104 can assign prompts to touchpoints that are more relevant to a given prompt. For example, Prompts 8 and 9 (shown in the Purchase Confirmation page) are questions relating to the purchase process and/or overall user experience. In some embodiments, the digital experience system 104 employs previous navigational patterns to determine the touchpoints to assign a prompt.

In addition, the digital experience system 104 can assign different versions of a prompt to the same or different touchpoint. To illustrate, as shown in FIG. 3A, the digital experience system 104 assigns a first version of the first prompt (i.e., Prompt 1A) to Element 1 and a second version of the first prompt (i.e., Prompt 1B) to Element 2. Then, depending on the element with which a respondent interacts, the digital experience system 104 provides the appropriate version of the first prompt.

Additionally, or alternatively, the digital experience system 104 determines which version of a prompt to provide to a respondent based on metadata associated with the respondent. For example, the digital experience system 104 initially assigns multiple prompts or multiple versions of a prompt to a touchpoint. When the touchpoint is triggered, the digital experience system 104 determines which prompt is best suited for the respondent and/or which prompt version to provide. For example, the respondent has a history of answering multiple-choice questions, but not free-form text questions. As such, the digital experience system 104 determines a prompt version that includes multiple-choice questions over a free-form text questions.

Further, in some embodiments, the digital experience system 104 assigns the same prompt to different touchpoints within the content experience 306. Because respondents often take different navigational paths, the digital experience system 104 can assign the same prompt, or different versions of the same prompt, along different navigational paths within the content experience 306. For example, the digital experience system 104 assigns different versions of the fourth prompt to the Men's Shirts page and the Women's Shirts page as a respondent is unlikely to access both pages. Similarly, the hierarchy structure 304 of the content experience 306 shows how the digital experience system 104 assigns different prompts or prompt versions among the product pages for men and women. Additional information regarding the digital experience system 104 assigning and providing prompts is provided below in connection with FIGS. 4 and 5.

As mentioned above, FIG. 3B illustrates two navigational paths through the content experience 306 for different users. In particular, FIG. 3B shows a first navigational path 310 for a male respondent and a second navigational path 312 for a female respondent. Each of the navigational paths show the activity and interactions of the respective respondents.

To illustrate, the first navigational path 310 shows that the male respondent entered the content experience 306 via the Homepage, accessed the Men's Product page, the Men's Shoes page, then accessed the web pages associated with the checkout process. Depending on whether the male respondent triggered touchpoints at each of the accessed web pages, the digital experience system 104 may provide him with Prompts 1A or 1B, 5B, 6, 7A or 7B, 8, and 9. For instance, the digital experience system 104 provides Prompt 1B to the male respondent based detecting Element 2 being triggered on the Homepage.

The second navigational path 312 shows that the female respondent entered the content experience 306 via the Homepage, accessed the Our Story page and the Women's Products page including each of the product types pages (i.e., Shirts, Pants, and Shoes), then accessed the pages associated with the checkout process. Depending on whether the female respondent triggered touchpoints at each of the accessed web pages, the digital experience system 104 may provide her with Prompts 1A or 1B, 3, 4B, 5A, 5B, 5C, 6, 7A or 7B, 8, and 9.

The digital experience system 104 can provide the same prompt (or different versions of the same prompt) to both respondents when the same touchpoints are triggered. For example, both respondents experienced the checkout process and possibly triggered the same touchpoints. As a result, as mentioned above, the digital experience system 104 provides both respondents with Prompts 6, 7A or 7B, 8, and 9.

In addition, as shown in FIG. 3B by the first navigational path 310 and the second navigational path 312, the female respondent interacts with more pages of the content experience 306. As a result of the increased interaction, the digital experience system 104 likely provides more prompts to the female respondent. However, more detailed navigational paths may reveal that while the male respondent interacts with less pages of the content experience 306, he also interacts with significantly more touchpoints within an individual page (e.g., the Men's Shoes), which causes the digital experience system 104 to provide a greater number of prompts to the male respondent.

Notably, in many embodiments, the digital experience system 104 does not provide all of the prompts from a template of prompts to either respondent. However, in some instances, depending on the number of prompts in a template of prompts, the amount of user interaction, and the responsiveness of a respondent, the digital experience system 104 can provide all of the prompt in a template of prompts (and possible multiple versions of the same prompt) to a respondent. In some cases, the digital experience system 104 provides all of the prompts to a respondent across multiple visits to the content experience 306 within a set time period (e.g., a week or month). Even in the above instances, the digital experience system 104 provides each prompt separately and individually to a respondent as part of the content experience 306 itself.

Further, as shown in FIG. 3B, the digital experience system 104 does not deliver the prompts to the respondent in a predefined order. Rather, the digital experience system 104 determined which prompts to provide to each respondent based on the navigational path established by the respondent. In this manner, the prompts naturally integrate into the content experience 306. Indeed, the digital experience system 104 provides various prompts to each respondent based on their own navigational path while they navigate throughout the content experience 306.

As also shown in FIG. 3B, both navigational paths start at the Homepage and eventually end up at the checkout process. Conceptually, the hierarchy structure 304 of the content experience 306 can be analogous to a funnel. For example, respondents can enter the content experience 306 from a variety of entry points (e.g., the Homepage or at a particular product page), which represent a wide opening of a funnel. As the respondent interacts with the content experience 306, the hierarchy structure 304 of the content experience 306 directs the user toward the checkout process, which represents a smaller exit of the funnel. In this manner, prompts are provided to the respondent at points along the navigational path and at times that best correspond to the respondent's journey within the content experience 306.

Thus, the content experience 306 provides touchpoints and interaction opportunities that direct a respondent from various locations of the content experience 306 to a particular location within the content experience. Accordingly, the digital experience system 104 can strategically associate prompts from a template of prompts to touchpoints with which a respondent will likely interact. Further, for other content experiences, such as a mobile application, the funnel methodology can also apply to a respondent's navigational path through the content experience to place associated prompts with touchpoints likely to be triggered.

Figure 4:
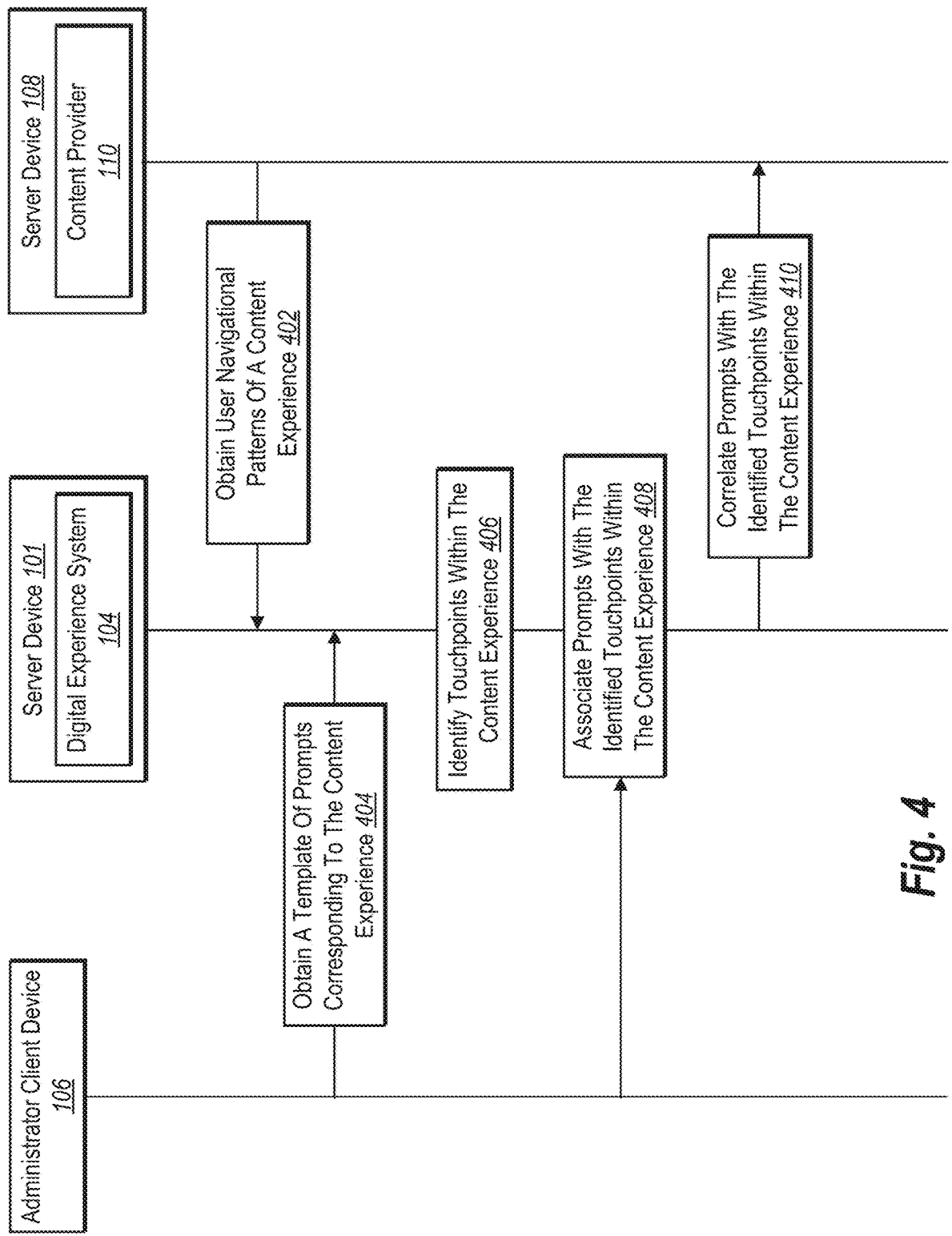
FIG. 4 illustrates an example sequence of correlating prompts to touchpoints for a content experience in accordance with one or more embodiments.

Turning now to FIG. 4, as mentioned above, additional detail is provided regarding assigning prompts to touchpoints and determining the prompt to provide to a respondent when a touchpoint is triggered. For instance, FIG. 4 illustrates an example sequence of correlating prompts in a template to touchpoints for a content experience in accordance with one or more embodiments. As shown, FIG. 4 includes the server device 101 that hosts the digital experience system 104, the administrator client device 106, and the server device 108 that hosts the content provider 110 implementing one or more actions 402-410. While certain acts are shown on a particular computing device in the illustrated embodiment, these acts can be performed by different or multiple computing devices in alternative embodiments. Furthermore, while the acts are described as being performed by the digital experience system 104, one will appreciate that this is shorthand for computer-readable instructions (e.g., part of the digital experience system) that when executed, cause the server devices 101, 108 and/or the administrator client device 106 to perform a given action as indicated by FIG. 4.

As mentioned above, FIG. 4 illustrates correlating prompts in a template to touchpoints for a content experience (e.g., content experience 112, 206, 306). In particular, FIG. 4 shows the digital experience system 104 obtaining 402 user navigational patterns of a content experience from the content provider 110. Navigational patterns can include a collection of navigational paths from various users (e.g., respondents and other visitors) of the content experience, including elements and interfaces with which users interact (e.g., historical data).

In particular, in one or more embodiments, the content provider 110 (and/or the digital experience system 104) gathers activity data for users of the content experience. For example, activity data can include when users accessed interfaces and elements of the content experience, how long users visited, how users interacted with each interface and element, how users accessed the content experience (e.g., type of computing device), and/or how users moved between interfaces and elements. For instance, the content provider 110 aggregates and analyzes navigational paths for a group or subgroup of users for a particular time period (e.g., a day, a week, a month, a year, or years) to obtain navigational patterns, which the content provider 110 then provides to the digital experience system 104. Alternatively, the content provider 110 provides multiple navigational paths to the digital experience system 104, which determines one or more navigational patterns for one or more groups of users of the content experience.

As shown further shown in FIG. 4A, the digital experience system 104 also obtains 404 a template of prompts corresponding to the content experience from the administrator client device 106. For example, an administrator provides prompts (e.g., survey questions) to provide to respondents accessing the content experience. In alternative embodiments, the digital experience system 104 provides or suggests prompts to include in a template of prompts. As mentioned above, only a single template of prompts is described for simplicity, but the digital experience system 104 can facilitate providing prompts from multiple prompt templates to respondents via the content experience.

In addition, the digital experience system 104 identifies 406 touchpoints within the content experience, as FIG. 4A shows. As mentioned above, a content experience can include numerous touchpoints with which a respondent can interact. For instance, touchpoints can be associated with interfaces (e.g., web pages, mobile application pages, links, selectable content, or portions thereof). In various embodiments, the digital experience system 104 identifies a subset of touchpoints within the content experience based on the obtained navigational patterns. For example, the digital experience system 104 employs the navigational patterns to identify which elements, interfaces, and/or touchpoints experience high amounts of user interaction and/or which types of user interactions are most common among users of the content experience.

Further, in some embodiments, the digital experience system 104 identifies different touchpoint groups based on the navigational patterns filtered for a specific group of users. For instance, the digital experience system 104 selects the most triggered touchpoint for male users, female users, teenage users, etc. The digital experience system 104 can associate these touchpoints with the corresponding group of users, which the digital experience system 104 can later access when assigning prompts to touchpoints.

In some embodiments, the digital experience system 104 identifies multiple touchpoints for a single interface or element. For example, the digital experience system 104 identifies that an image in a mobile application has a touchpoint for viewing the image, another touchpoint for selecting the image, and still another touchpoint for sharing the image. The digital experience system 104 can detect a respondent interacting with each of the touchpoints associated with the image. Additionally, or alternatively, the digital experience system 104 can associate multiple trigger types to the same touchpoint (e.g., hovering over an element for a set period of time or selecting the element triggers the same touchpoint).

Upon identifying touchpoints in the content experience, in one or more embodiments, the digital experience system 104 stores the touchpoints in a table based on corresponding touchpoint identifiers. In general, upon creating the content experience, the content provider 110 can assign identifiers to each of the components of the content experience (e.g., the interfaces, elements, and touchpoints), including the content experience itself.

In addition, the content provider 110 can associate corresponding components together. For instance, the content provider 110 links the element identifier for an element to the interface identifier in which the element resides. Further, the content provider 110 can link the element identifier and/or the interface to the content experience identifier of the content experience. In some embodiments, an element resides within another element and/or an interface is included within another interface. In these embodiments, the content provider 110 can also similarly associate identifiers to one or more corresponding identifiers.

As mentioned above, the digital experience system 104 can store the touchpoints in a table based on a corresponding touchpoint identifier. For example, the digital experience system 104 generates a first table that stores a first subset of touchpoint identifiers corresponding to respondents of a first profile type and a second table that stores a second subset of touchpoint identifiers corresponding to respondents of a second profile type.

As shown in FIG. 4, the digital experience system 104 associates 408 prompts with the identified touchpoints within the content experience. For instance, the digital experience system 104 matches prompts from the template of prompts to the identified touchpoints based on one or more factors, such as prompt relevance, prompt priority, touchpoint popularity, user data, element data, navigational data, and/or manual input received from the administrator client device 106. For example, the digital experience system 104 assigns the highest priority prompt to a popular (e.g., high-traffic) touchpoint. In another example, the digital experience system 104 determines that a prompt corresponds to a particular interface and assigns the prompt to a touchpoint within the interface.

The digital experience system 104 can associate each prompt in the template of prompts with one or more touchpoints within the content experience. In various embodiments, the digital experience system 104 ensures that each prompt in the template of prompts is associated with at least one touchpoint within the content experience. In this manner, a respondent can potentially be provided with every prompt within the template of prompts. Indeed, the digital experience system 104 can identify multiple potential navigational paths within the content experience and assign each of the prompts from the template of prompts along each navigational path to enable respondents to answer many or all of the prompts. Furthermore, in some embodiments, the digital experience system 104 incorporates the funnel methodology described above to determine which touchpoints to place at particular points of the content experience.

In many embodiments, the digital experience system 104 associates a prompt with a touchpoint by storing the identifier of the touchpoint, element, and/or interface with a prompt identifier of the prompt. For example, the digital experience system 104 maintains a survey database that includes an identifier for each prompt in a template of prompts. When the digital experience system 104 associates a prompt with a touchpoint, the digital experience system 104 stores the touchpoint identifier in the database in association with the prompt. In some cases, a prompt is associated with the identifiers of multiple touchpoints in a content experience that are each associated with the prompt.

In addition to associating prompts from the template of prompts to identified touchpoints of the content experience, the digital experience system 104 can also provide one or more trigger conditions for a prompt. In one or more embodiments, the digital experience system 104 specifies that a trigger condition for a touchpoint is satisfied based on a single interaction, such as an interface or element being requested, accessed, served, impressed, displayed, viewed, hovered, clicked, or dismissed.

Alternatively, the digital experience system 104 can specify that a trigger condition is satisfied when multiple respondent interactions occur. For example, in one or more embodiments, the digital experience system 104 requires that a first prompt (e.g., a prerequisite prompt) be presented to a respondent before a second prompt is provided. For instance, the second prompt is a follow-up to the first prompt from the template of prompts. Thus, when a touchpoint associated with a second prompt is triggered, the digital experience system 104 either refrains from presenting the second prompt or determines to present the first prompt (or another prompt) instead.

In another example, the digital experience system 104 provides a trigger condition that includes a respondent interacting with a sequence of touchpoints before providing a prompt. In some embodiments, the respondent must interact with the touchpoints in a specific order. In other embodiments, the respondent must interact with all the touchpoints, but in any order, or a relaxed order (e.g., any order except for a particular touchpoint, which must be touched first or last). In various embodiments, the respondent must first interact with at least a minimum number of touchpoints.

In an additional example, the digital experience system 104 provides a trigger condition that indicates that a prompt not be provided to a respondent if the same prompt has been previously provided during the content experience. Alternatively, the digital experience system 104 determines to provide a different version of the prompt (e.g., different wording, different question type, or different answer options) based on whether the respondent answered the prompt the previous time it was provided. In addition, the digital experience system 104 can determine to provide an alternative prompt from the template of prompts (e.g., a secondary prompt associated with the touchpoint) when a triggered touchpoint is associated with a prompt that has been previously presented and/or responded to by the respondent during the content experience.

In another example, the digital experience system 104 provides a trigger condition that involves a timer to elapse before providing a prompt associated with a touchpoint. For example, upon a respondent accessing a particular interface, the digital experience system 104 waits 60 or 120 seconds for the user to remain in the interface before providing the prompt to the user. In some embodiments, the digital experience system 104 provides a trigger condition that involves a prompt not be provided until a user triggers a subsequent touchpoint. For instance, the digital experience system 104 provides a prompt associated with a first element upon the user navigating from the first element to a second element.

In some embodiments, the digital experience system 104 provides a trigger condition that involves an elapsed time since the previous prompt was last presented. For example, the digital experience system 104 ensures that the user not be asked a prompt more than once every five minutes within the content experience by restarting a 5-minute time each time a prompt is presented. Similarly, the digital experience system 104 ensures that the user not be asked more than three prompts in a five-minute span of time.

In additional embodiments, the digital experience system 104 can also associate a particular version of a prompt with a touchpoint. For example, the digital experience system 104 associates a first version of a prompt with a touchpoint of a first element and a second version of the prompt with a touchpoint of a second element. Thus, depending on the element with which a respondent interacts, the digital experience system 104 determines which version of the prompt to present.

Further, the digital experience system 104 can associate multiple versions of a prompt with a touchpoint. For example, the digital experience system 104 determines which version of a prompt to provide to the respondent based on the metadata associated with the respondent interacting with the touchpoint. Examples of metadata can include profile information, previous prompts responded to in the current and previous content experiences, prompt versions responded to and ignored, feedback quality of previous responses, and navigational path details.

As mentioned above, the digital experience system 104 provides different versions of a prompt to a respondent. In one or more embodiments, a different version of a prompt includes providing the prompt as a different question type (e.g., multiple-choice, open-ended, free-form, ranking, scoring, summation, demographic, dichotomous, etc.). In some embodiments, a different version of a prompt includes providing different question wording or providing different available answers (e.g., a different set of multiple-choice answers). In general, each version of a prompt still enables the digital experience system 104 to receive comparable feedback to the different versions of the prompt.

In some embodiments, the digital experience system 104 provides a prompt using different delivery methods. Examples of delivery methods includes element overlays, pop-up elements, inline elements, modal windows, and electronic messages. To illustrate, the digital experience system 104 can provide a prompt to a user in a graphical element that overlays an interface or element (e.g., a pop-up bubble), appears in line with an interface or element, or that is incorporated into an interface or element (e.g., within a chat or messaging thread). Notably, the digital experience system 104 provides the prompt such that the prompt becomes part of the interactive content experience.

Thus, as mentioned above, in associating a prompt from the template of prompts with one or more touchpoints, the digital experience system 104 can include a number of options that indicate when to serve a prompt, which versions of the prompt to serve, and the delivery method to use when serving the prompt. In addition, the digital experience system 104 can indicate backup or alternative prompts for a touchpoint along with directions of when to provide a backup or alternative prompt.

Returning to FIG. 4, the digital experience system 104 correlates 410 the prompts with the identified touchpoints within the content experience. For example, the digital experience system 104 provides direction to the content provider 110 indicating the touchpoints that are relevant to the digital experience system 104. For instance, in some embodiments, the digital experience system 104 provides code (e.g., listening commands) to the content provider 110 to include within the content experience that reports back, or enables the digital experience system 104 to detect when and how a particular touchpoint is being interacted with by a respondent.

Figure 5:
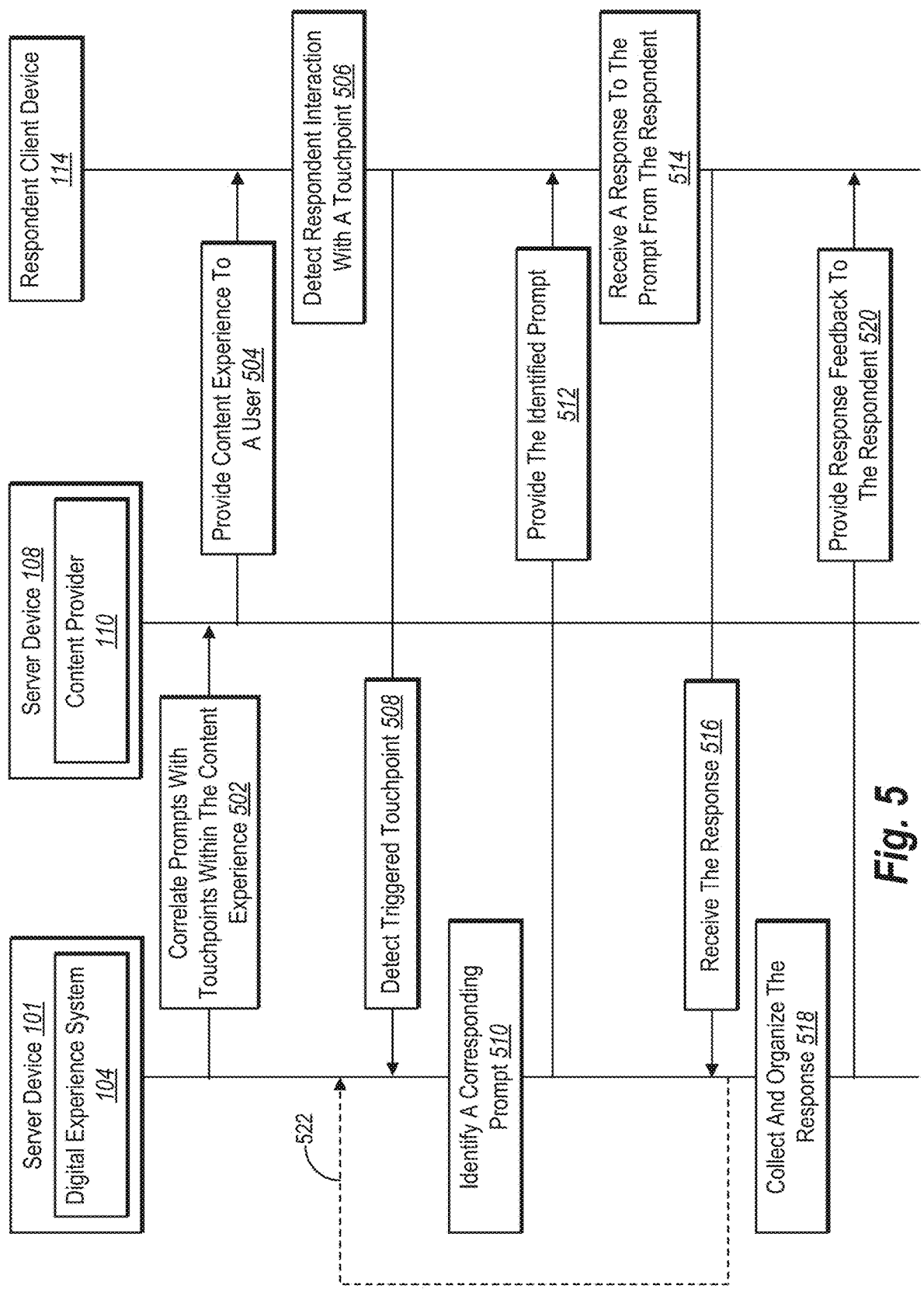
FIG. 5 illustrates an example sequence of providing prompts to respondents based on triggered touchpoints of a content experience in accordance with one or more embodiments.

FIG. 5 illustrates an example sequence of providing prompts to respondents based on triggered touchpoints of a content experience in accordance with one or more embodiments. As shown, FIG. 5 includes the server device 101 that hosts the digital experience system 104, the server device 108 that hosts the content provider 110, and a respondent client device 114 implementing one or more actions 502-520. While certain acts are shown on a particular computing device in the illustrated embodiment, these acts can be performed by different or multiple computing devices in alternative embodiments. Furthermore, while the acts are described as being performed by the digital experience system 104, one will appreciate that this is shorthand for computer-readable instructions (e.g., part of the digital experience system) that when executed, cause the server devices 101, 108 and/or the respondent client device 114 to perform a given action as indicated by FIG. 5.

As mentioned above, FIG. 5 illustrates the digital experience system 104 providing prompts to respondents based on the respondent triggering touchpoints of a content experience (e.g., content experience 112, 206, 306). To illustrate, FIG. 5 shows the digital experience system 104 correlating 502 prompts with touchpoints within the content experience, which the digital experience system 104 provides to the content provider 110. For example, in one or more embodiments, the digital experience system 104 assigns prompts with touchpoints of a content experience as described above in connection with FIG. 4. In alternative embodiments, a survey administrator assigns prompts from a template of prompts to various touchpoints within the content experience.

In addition, FIG. 5 shows the content provider 110 providing 504 the content experience to a user of the respondent client device 114. For example, the content provider 110 enables a user to download and access the content experience via a website or a mobile application. In addition, the digital experience system 104 provides the content provider 110 with code to incorporate into the content experience, which allows the digital experience system 104 to detect and indicate when various touchpoints within the content experience are triggered, as previously described. In this manner, the content provider 110 and/or digital experience system 104 can detect when a respondent's interaction triggers a touchpoint.

To illustrate, a respondent navigates through the content experience via the respondent client device 114 and interacts with various touchpoints associated with interfaces and elements. As shown in FIG. 5, the respondent client device detects that the respondent interacts 506 with a touchpoint. For example, the respondent accesses an interface, selects an element, engages in a chat with a service agent, or remains a visitor on a product page. In some embodiments, a respondent provides user input that interacts with multiple touchpoints at the same time.

In response to detecting user interaction with a touchpoint, the digital experience system 104 (and/or the content provider 110) detects 508 the triggered touchpoint. In particular, the digital experience system 104 determines whether the user interaction of the respondent with the touchpoint satisfies one or more trigger conditions indicated for the touchpoint. For example, if the trigger conditions specify that the respondent first interact with other touchpoints, the digital experience system 104 can verify that the other touchpoints have previously been activated or triggered by the respondent within the content experience.

As part of detecting the triggered touchpoint, the digital experience system 104 looks up the touchpoint identifier of the triggered touchpoint. For example, the touchpoint identifier identifies the interface and/or element to which the trigger touchpoint corresponds within the content experience. Further, as described below, the digital experience system 104 can use the touchpoint identifier to provide a prompt to a respondent.

As shown, the digital experience system 104 identifies 510 a corresponding prompt based on the triggered touchpoint to provide to the respondent. As mentioned above, in one or more embodiments, the digital experience system 104 previously correlated prompts to touchpoints within the content experience. Accordingly, the digital experience system 104 identifies the prompts assigned to the triggered touchpoint. For example, the digital experience system 104 employs the touchpoint identifier to look up the prompt assigned to a touchpoint. In alternative embodiments, the digital experience system 104 employs one or more factors, as explained below, to determine which prompt from the template of prompts to provide to the respondent. Thus, in one or more embodiments, the digital experience system 104 can associate multiple prompts to a touchpoint. Then, when the digital experience system 104 detects that a respondent has triggered the touchpoint, the digital experience system 104 determines which of the prompts to provide to the respondent.

In another example, the digital experience system 104 determines whether a prompt has previously been provided to, or answered by, the respondent. If yes, the digital experience system 104 determines whether to provide an alternative version of the prompt, a different prompt, or no further prompt. For instance, if the digital experience system 104 previously provided a first version of a prompt to the respondent, but the respondent did not respond, the digital experience system 104 can determine to provide a second version of the prompt (e.g., a simple thumbs-up or thumbs-down prompt) to the respondent. Alternatively, if the respondent previously answered a first version of the prompt (e.g., a multiple-choice prompt), the digital experience system 104 determines to provide a second version of the prompt (e.g., a free-form text prompt) to obtain additional feedback with respect to the prompt.

When multiple prompts are associated with a touchpoint, in one or more embodiments, the digital experience system 104 determines which prompt or prompt version to provide for a triggered touchpoint based on how a respondent triggers a touchpoint. For example, in response to a respondent interacting with an element, the digital experience system 104 determines a level of engagement based on the type of interaction or interactions between the respondent and the element. If the level of engagement is low, the digital experience system 104 determines to provide a first prompt or first prompt version (e.g., a prompt that requires little effort to answer and that provides a lower level of feedback) to the respondent. If the level of engagement is high, the digital experience system 104 determines to provide a second prompt or second prompt version (e.g., a prompt that requires more effort to answer and that provides a higher level of feedback) to the respondent. As mentioned above, in some embodiments, an element is associated with various touchpoints that each correspond to a different type of level of engagement/user interaction.

With respect to determining engagement levels, the digital experience system 104 can measure engagement based on user interactions with discrete touchpoints and/or the digital experience. In one or more embodiments, the digital experience system 104 measures levels of engagement based on number of clicks, content clicked, viewing time, mouse position, mouse hover time, actionable requests (e.g., likes and shares), comments, or path position within the digital experience. For example, the digital experience system 104 determines a low level of engagement based on the respondent not satisfying a minimum interaction time threshold content item of the digital experience. In another example, the digital experience system 104 determines a high level of engagement based on a short response time to a previous prompt or if the respondent has triggered multiple touchpoints along their journey through the digital experience.

Further, in some embodiments, the digital experience system 104 determines which prompt or prompt version to provide for a triggered touchpoint based on metadata. For example, the digital experience system 104 analyzes analytics data (e.g., digital breadcrumbs) to determine how responsive the respondent has been within the content experience and/or previous prompts (within the same or previous content experiences). For instance, the digital experience system 104 provides progressively more involved prompts as the user continues to respond to the prompts while interacting with the content experience. Likewise, when the user dismisses a previous prompt, the digital experience system 104 can determine to provide a prompt or prompt version assigned to the touchpoint that takes less effort to respond.

In addition, in various embodiments, the digital experience system 104 determines which prompt or prompt version to provide for a triggered touchpoint based on user profile data. For example, the digital experience system 104 uses a respondent identifier to look up profile data of the respondent. Based on preferences or other stored data, the digital experience system 104 selects a prompt or prompt version (or delivery method) assigned to a touchpoint. For example, if the respondent is a female, the digital experience system 104 selects the prompt version that asks about products for woman. Moreover, the digital experience system 104, in some embodiments, determines which prompt or prompt version assigned to a touchpoint to provide based on additional factors, as described above in connection with FIG. 4.

Further, in some embodiments, the digital experience system 104 customizes a prompt based on the context of the triggered touchpoint. For example, Product X and Product Y each have similar touchpoint trigger conditions and are both associated with the same prompt from the template of prompts. However, when the touchpoint for Product X is triggered, the digital experience system 104 inserts "Product X" into the prompt (e.g., in the question or as a potential answer). Likewise, the digital experience system 104 can insert "Product Y" when providing the prompt in response to the touchpoint for Product Y being triggered. Additionally, even though the prompt is customized, the digital experience system the can prevent the prompt from being provided twice when touchpoints for both products are triggered. Alternatively, the digital experience system 104 can provide both prompts and combine or link both responses to the prompt within a response database.

As shown in FIG. 5, upon determining the prompt, the digital experience system 104 provides 512 the identified prompt to the respondent client device 114, which serves the prompt to the respondent. In addition, the respondent client device 114, receives 514 a response to the prompt from the respondent. For example, the respondent employs an input device of the respondent client device 114 to select an answer and/or provide feedback to the prompt. Once the respondent responds to the prompt, the respondent client device 114 can hide the prompt or non-obtrusively display the prompt within the content experience such that the respondent can continue on their journey within the content experience.

In addition, the digital experience system 104 receives 516 the response from the respondent client device 114, as shown. In response, the digital experience system 104 collects 518 and organizes the response. For example, in one or more embodiments, the digital experience system 104 marks the response with the respondent identifier and stores the response with similar responses for the same prompt in a response database. Additionally, or alternatively, the digital experience system 104 updates a table that indicates the prompts from the template of prompts to which the respondent has responded. In this manner, the digital experience system 104 can track which prompts (and prompt versions) that the respondent has been asked, the respondent has answered, remain unanswered, and require further feedback from the respondent to adequately answer. As described above, the digital experience system 104 can use the table when determining which prompt to provide to a user when a touchpoint is triggered.

As shown, the digital experience system 104 provides 520 response feedback to the respondent. For example, the digital experience system 104 provides group results of a prompt to a respondent that just answered the prompt. In another example, the respondent provides a response that request the content provider 110 add a feature, fix a bug, or modify an element. Upon the content provider 110 modifying the content experience in connection with the respondent's answer, the digital experience system 104 can send a notification to the respondent that the respondent's feedback has been heard and implemented. Additional description regarding providing response feedback is provided below in connection with FIGS. 8A and 8B.

In addition, the acts 508-516 can repeat as the respondent continues to interact with the content experience. For example, as the respondent interacts with additional touchpoints, the digital experience system 104 detects 508 the additional triggered touchpoints, identifies 510 and provides 512 corresponding prompts to the respondent client device 114, and receives 516 responses from the respondent via the respondent client device 114.

In some embodiments, the digital experience system 104 can provide prompts from the template of prompts to a respondent across multiple content experience sessions. For example, a respondent regularly accesses a content experience. On one visit, the digital experience system 104 can provide a first prompt from a template of prompts to the respondent. On a subsequent visit, the digital experience system 104 can provide a second prompt from the template of prompts to the respondent. The digital experience system 104 can continue to provide prompts to the respondent from the template of prompts until all prompts are asked and/or a time parameter associated with the template of prompts is closed.

Similarly, the digital experience system 104 can provide prompts across different media channels. For example, a respondent interacts with a content experience via both a website and mobile application. As such, the digital experience system 104 can provide prompts from the template of prompts to the respondent via both the website and the mobile application. The digital experience system 104 can employ further media channels to provide prompts, such as electronic messages (e.g., email, instant message, or message boards). In some embodiments, the version of a prompt that the digital experience system 104 provides to the respondent is based on the media channel used to provide the prompt.

In some embodiments, the digital experience system 104 can use the mobile application to detect that the respondent triggers a physical touchpoint, and, in response, provide a prompt to the respondent. For example, the digital experience system 104 detects that the respondent is at the brick-and-mortar store of the content provider. Based on detecting the respondent's location, the digital experience system 104 provides a prompt from the template of prompts to the respondent. For instance, the digital experience system 104 provides a prompt to the respondent' mobile device (e.g., via text, push notification, or within the mobile application). Similarly, the digital experience system 104 can inquire regarding the respondent's experience the next time the respondent accesses the digital content experience.

The acts described in relation to FIGS. 4 and 5 are intended to be illustrative of one or more series of acts in accordance with the present disclosure and is not intended to limit potential embodiments. Alternative embodiments can include additional, fewer, or different acts than those articulated in FIGS. 4 and 5. For example, the digital experience system 104 can perform act 406 and act 408 without act 402 occurring. Additionally, the acts described herein may be performed in a different order, may be repeated or performed in parallel with one another, or may be performed in parallel with different instances of the same or similar acts.

Figure 6A:
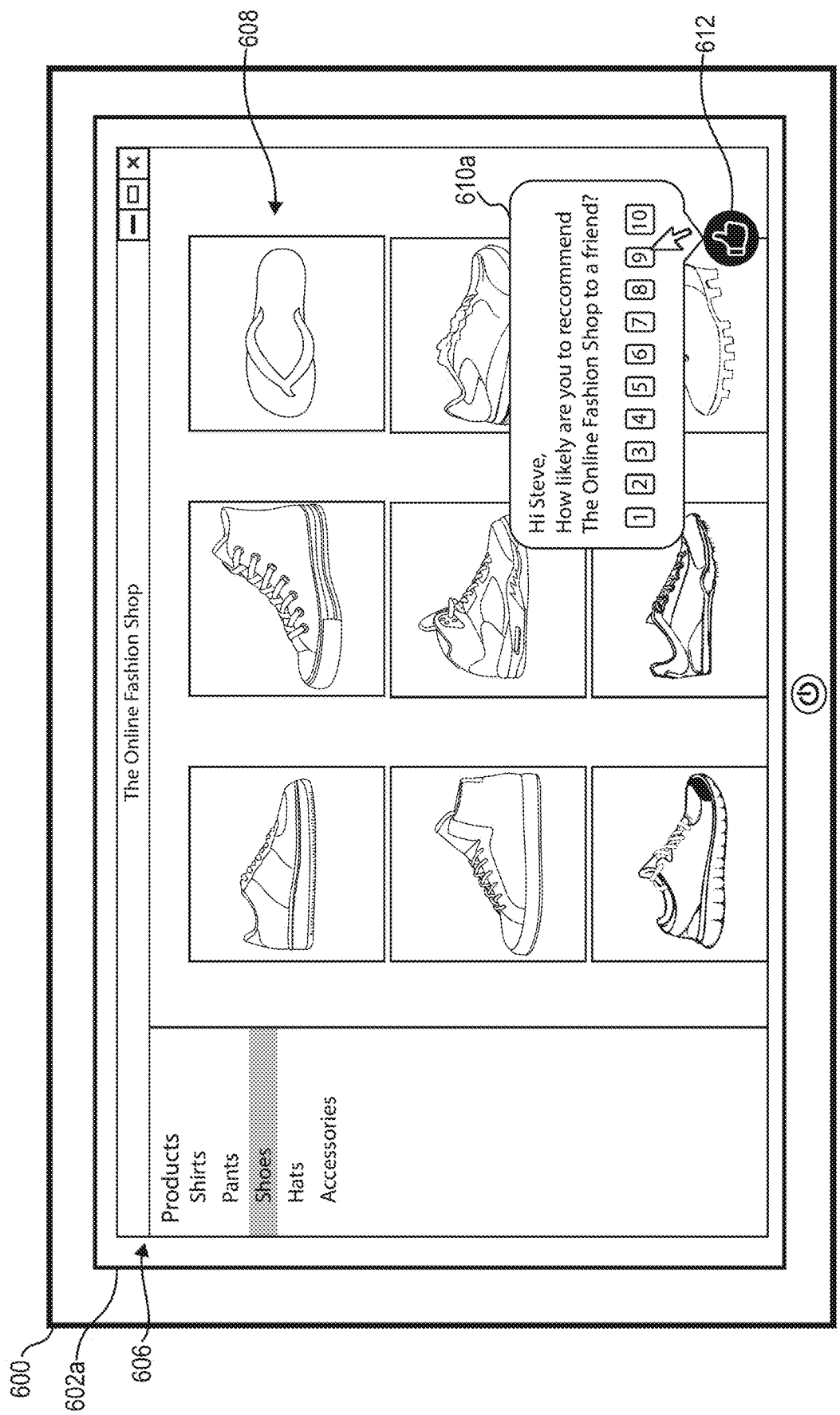
FIGS. 6A-6D illustrate example graphical user interfaces for providing prompts to a respondent within a website content experience in accordance with one or more embodiments.
Figure 6B:
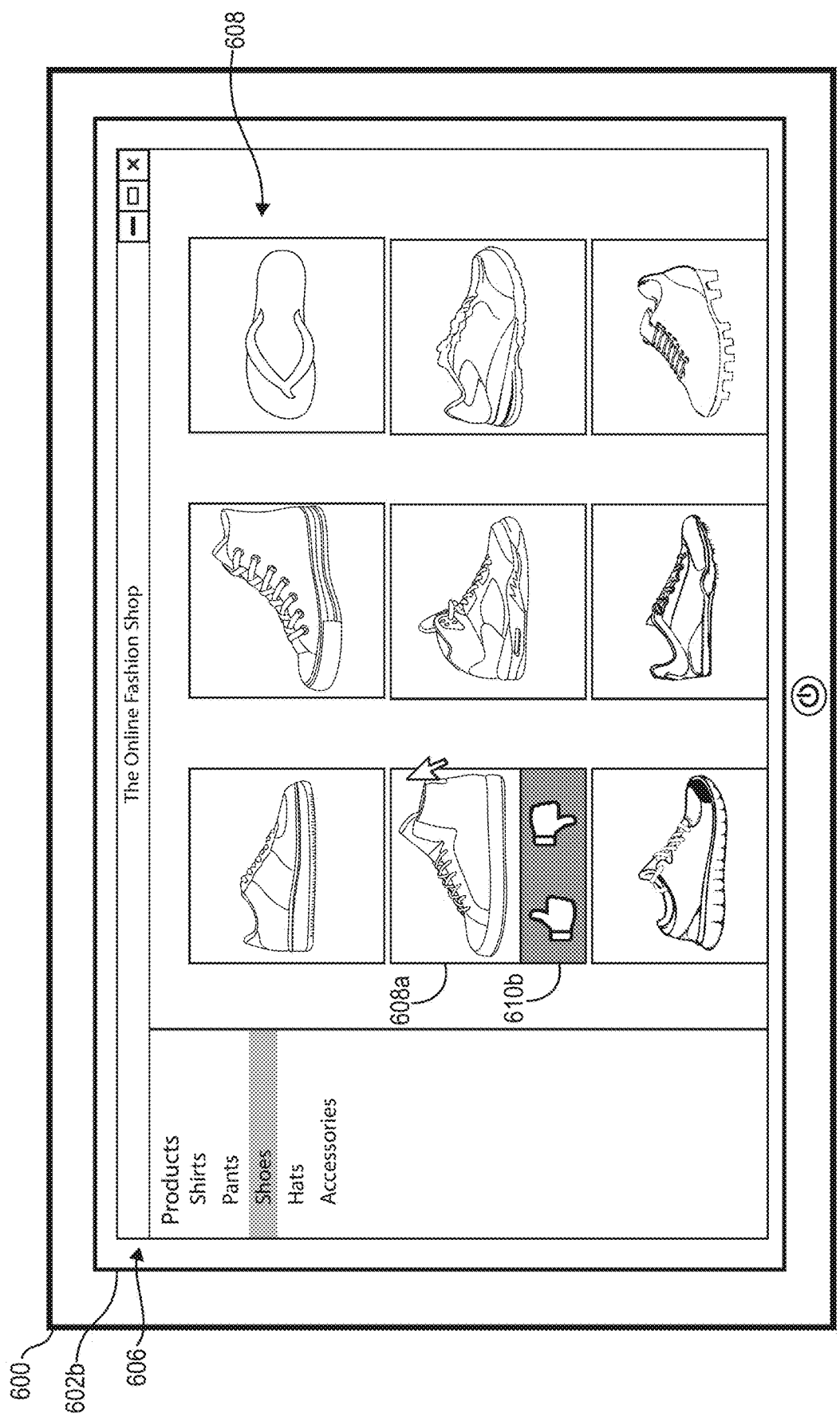
Figure 6C:
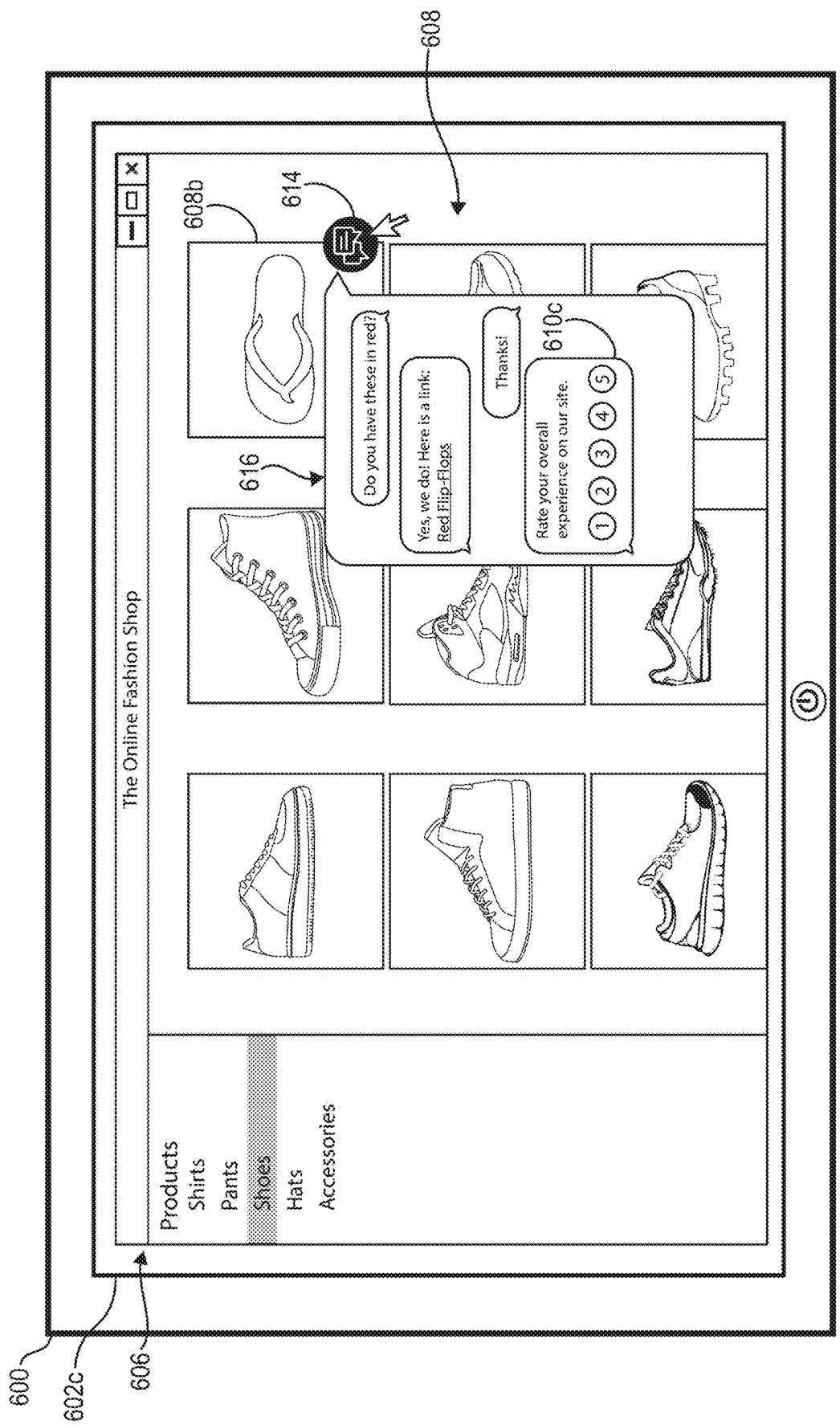
Figure 6D:
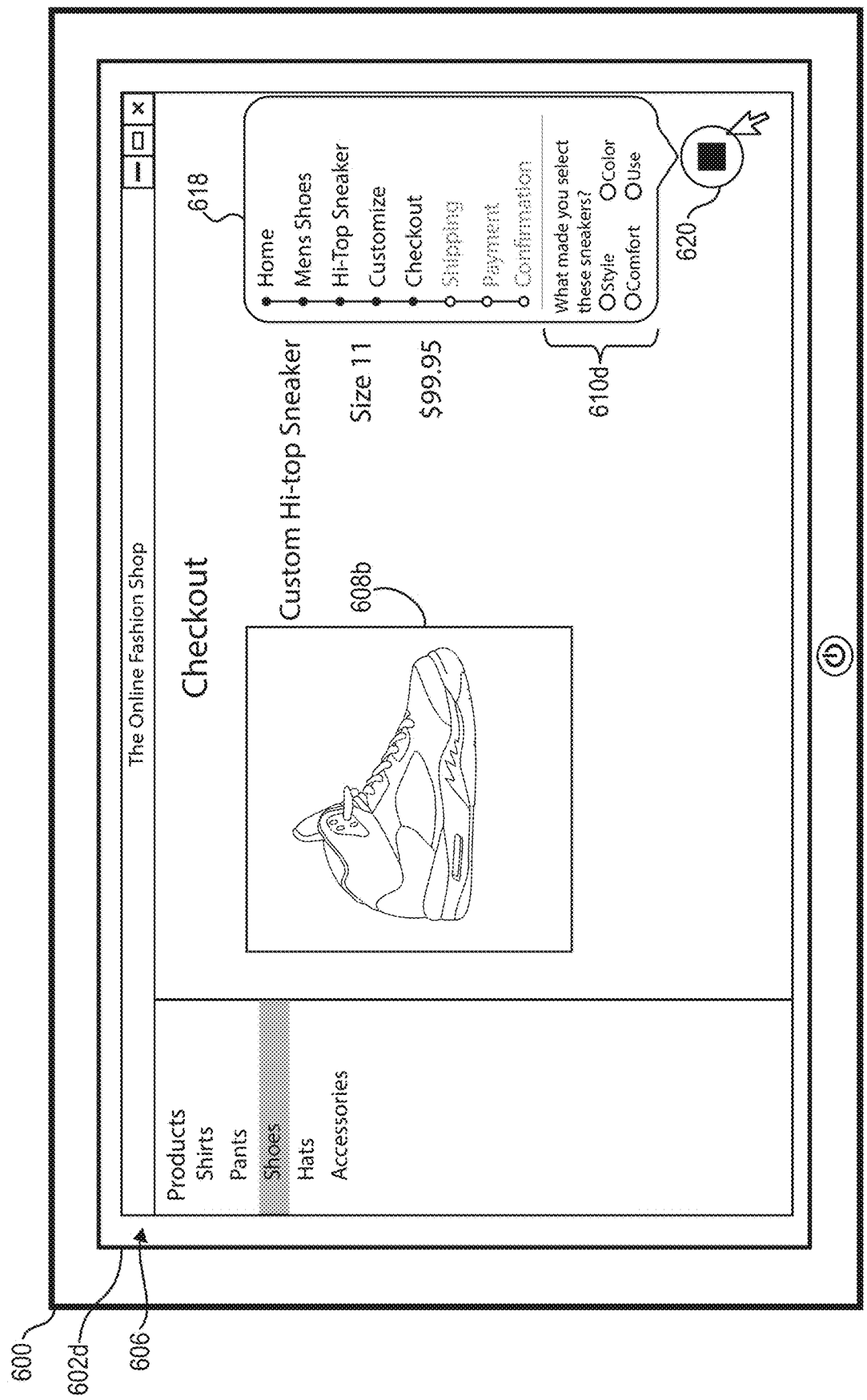

FIGS. 6A-6D illustrate example graphical user interfaces for providing prompts to a respondent within a website content experience in accordance with one or more embodiments. Indeed, FIGS. 6A-6D illustrate examples of providing different prompts and prompt versions to a respondent within a content experience. As shown, each of FIGS. 6A-6D includes a respondent client device 600 having a graphical user interface that displays a prompt to a respondent interacting with a content experience 606. More specifically, FIG. 6A shows a first graphical user interface 602a, FIG. 6B shows a second graphical user interface 602b, FIG. 6C shows a third graphical user interface 602c, and FIG. 6D shows a fourth graphical user interface 602d.

FIG. 6A shows the first graphical user interface 602a that includes an example content experience 606 (i.e., a website called "The Online Fashion Shop"). For instance, the content experience 606 is an online website that offers various products including shirts, pants, shoes, hats, and accessories. In addition, the first graphical user interface 602a shows a respondent actively interacting with the content experience 606 via the respondent client device 600 (e.g., the respondent controls the cursor shown in the first graphical user interface 602a).

In addition to including products 608 (e.g., various shoes), the first graphical user interface 602a includes a feedback graphic 612. Based on the respondent's interacting with the content experience 606, the digital experience system 104 can provide a first prompt 610a to the respondent within the content experience. For example, based on the respondent hovering over or selecting the feedback graphic 612, the digital experience system 104 provides the first prompt 610a to the respondent. Alternatively, based on the respondent triggering one or more touchpoints within the first graphical user interface 602a, the digital experience system 104 displays the first prompt 610a. For instance, if the respondent interacts with five or more product images 608 or remains on the same web page for over 90 seconds, the digital experience system 104 detects a triggered touchpoint and provides the first prompt 610a to the respondent.

As shown, the first prompt 610a asks the respondent about recommending the content experience to others. As shown, the digital experience system 104 provides the first prompt 610a as a net promoter score (NPS) prompt that enables the respondent to select a rating between one and ten. In alternative embodiments, digital experience system 104 provides the first prompt 610a as a different prompt version. While a prompt can be directed related to a respondent's interactions within the content experience 606, in some embodiments, a prompt corresponds to the respondent's experience with the content experience 606 as a whole.

In addition, the first prompt 610a is shown within a graphical bubble that pops up from the feedback graphic 612. In some embodiments, the first prompt 610a is provided using a different delivery method, element, or channel. In various embodiments, the digital experience system 104 causes the first prompt 610a to appear elsewhere within the first graphical user interface 602a, such as inline along the top or bottom of the content experience 606.

Further, as described previously, the digital experience system 104 receives the respondent's answer to the first prompt 610a. For example, the digital experience system 104 receives the number selected by the respondent and stores the response with a respondent identifier in a response database, as previously described. Additionally, the digital experience system 104 hides the first prompt 610a upon the respondent providing a response. In some embodiments, the user must select a response for the first prompt 610a to disappear. In alternative embodiments, the first prompt 610a includes an option to close or hide the first prompt 610a without providing an answer or response. In the event the user elects to close or hide the first prompt 610a, the digital experience system 104 can collect the respondent's interaction and use it to further determine how, when, or if to provide other prompts based on the principles described herein.

As explained earlier, the digital experience system 104 can provide multiple discrete prompts to a respondent throughout the content experience 606. For example, as shown in FIG. 6B, the digital experience system 104 detects a triggered touchpoint that is associated with a first product 608a as shown in the second graphical user interface 602b. In response, the digital experience system 104 determines to provide a prompt that is integrated into the content experience 606.

As shown, the digital experience system 104 provides a second prompt 610b in line with the first product (e.g., the thumbs-up or thumbs-down). Indeed, the digital experience system 104 identifies and provides a prompt to the respondent regarding their opinion of a product, such as the first product. Upon the respondent selecting one of the available answers, the digital experience system 104 can hide the second prompt 610b and/or provide results of other respondents to the second prompt 610b (e.g., 78% thumbs-up and 12% thumbs-down).

As a further illustration, FIG. 6C shows the digital experience system 104 providing a different prompt to a user in response to a respondent triggering a touchpoint within the content experience 606. For example, the third graphical user interface 602c includes a chat graphic 614 that a user can select to message a content provider agent. In some embodiments, the touchpoint for an element (e.g., a second product 608b) surfaces the chat graphic 614 when triggered rather than triggering a prompt. For instance, if the respondent hovers over the second product for a threshold period of time, then the chat graphic 614 surfaces.

As shown, the respondent selects the chat graphic 614 to initiate a messaging thread 616 with a content provider agent. The messaging thread 616 can serve as an element that is associated with one or more touchpoints. For example, the messaging thread 616 includes a touchpoint that is triggered when the respondent receives a satisfactory answer from the content provider agent. To illustrate, the digital experience system 104 detects a triggered touchpoint associated with the messaging thread 616. In response, the digital experience system 104 identifies and provides a third prompt 610c to the respondent within the messaging thread 616. As shown, the third prompt 610c asks the respondent to select a multiple-choice answer that ranks their overall experience with the content experience 606.

In some embodiments, the third prompt 610c invokes a text response from the respondent to better suit the context of the messaging thread 616. In any case, by providing the third prompt 610c within the messaging thread 616, the digital experience system 101 directly integrates the prompt into the content experience 606 resulting in a less intrusive experience for the respondent. Further, the digital experience system 104 can determine that a user within the messaging thread 616 has a heightened level of engagement, and as such, can continue to provide various prompts to the respondent, such as when the respondent is waiting between responses from the content provider agent to keep the respondent engaged with the content experience 606.

In FIG. 6D, the fourth graphical user interface 602d updates to show a product checkout page of the content experience 606. To assist the respondent, the content provider and/or digital experience system 104 provides a checkout roadmap 618 to the respondent to guide them through the checkout process. For example, the checkout roadmap 618 surfaces from a checkout assistance graphic 620 selected by the respondent.

As shown, in response to detecting a triggered touchpoint associated with the checkout roadmap 618, the digital experience system 104 provides the fourth prompt 610d to the respondent within the checkout roadmap 618. Indeed, the digital experience system 104 provides the fourth prompt 610d by directly integrating the fourth prompt 610d into the content experience 606. As a result, the fourth prompt 610d further enhances the respondent's interactions with the content experience 606.

Figure 7B:
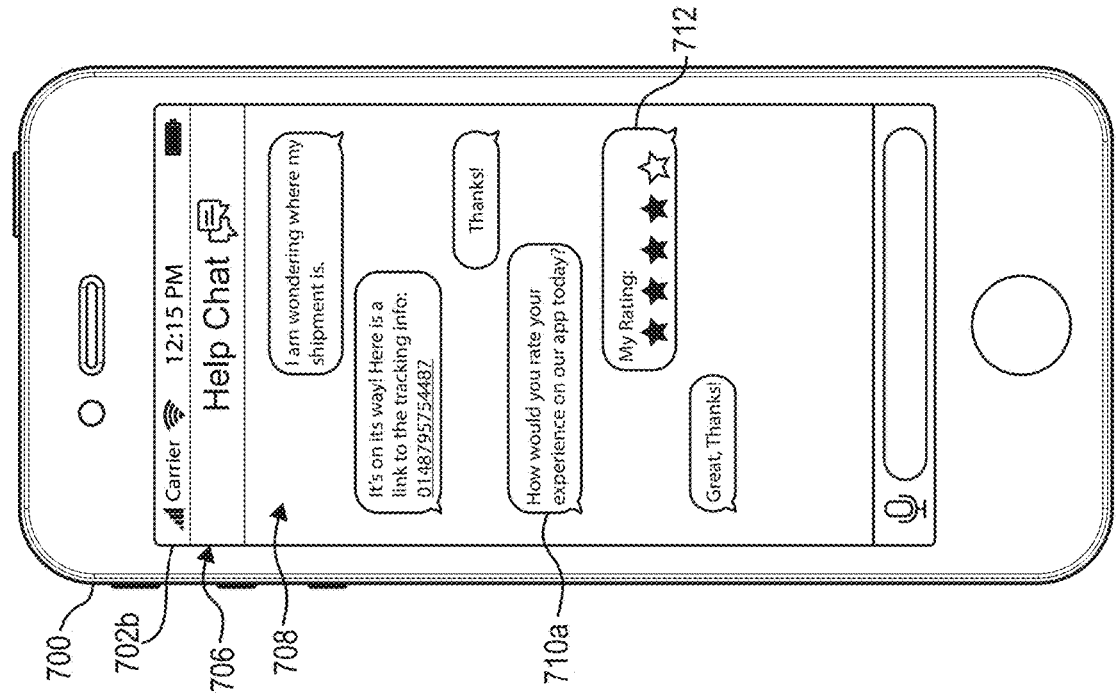
FIGS. 7A-7C illustrate example graphical user interfaces for providing prompts to a respondent within a mobile application content experience in accordance with one or more embodiments.
Figure 7A:
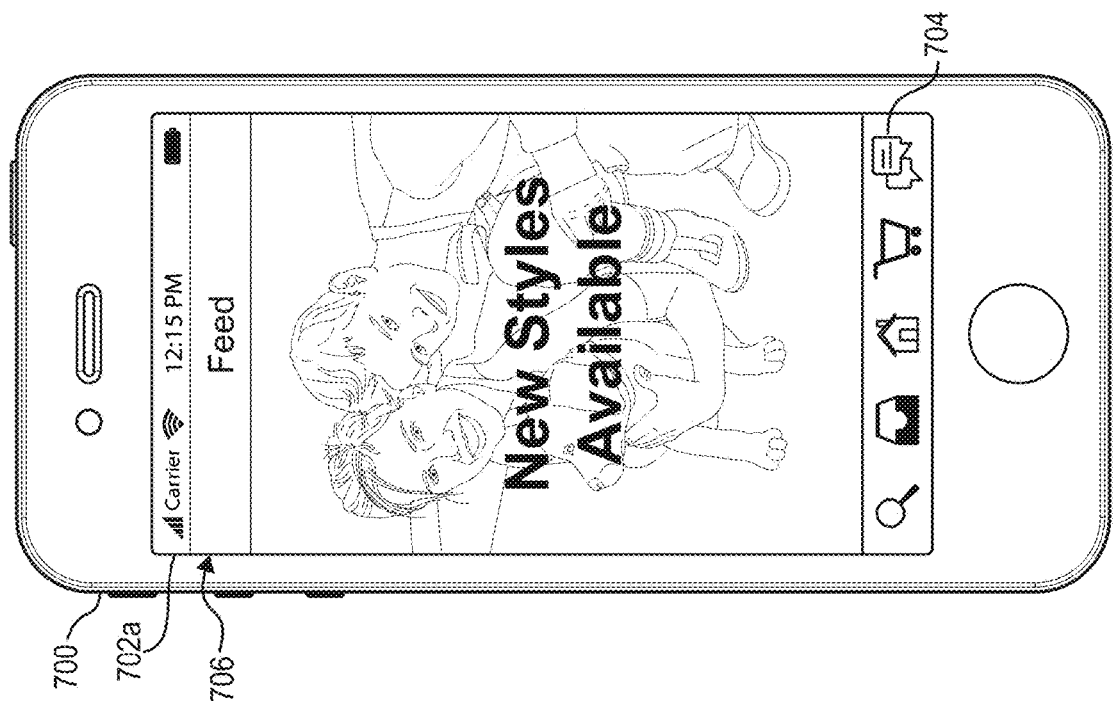
Figure 7C:
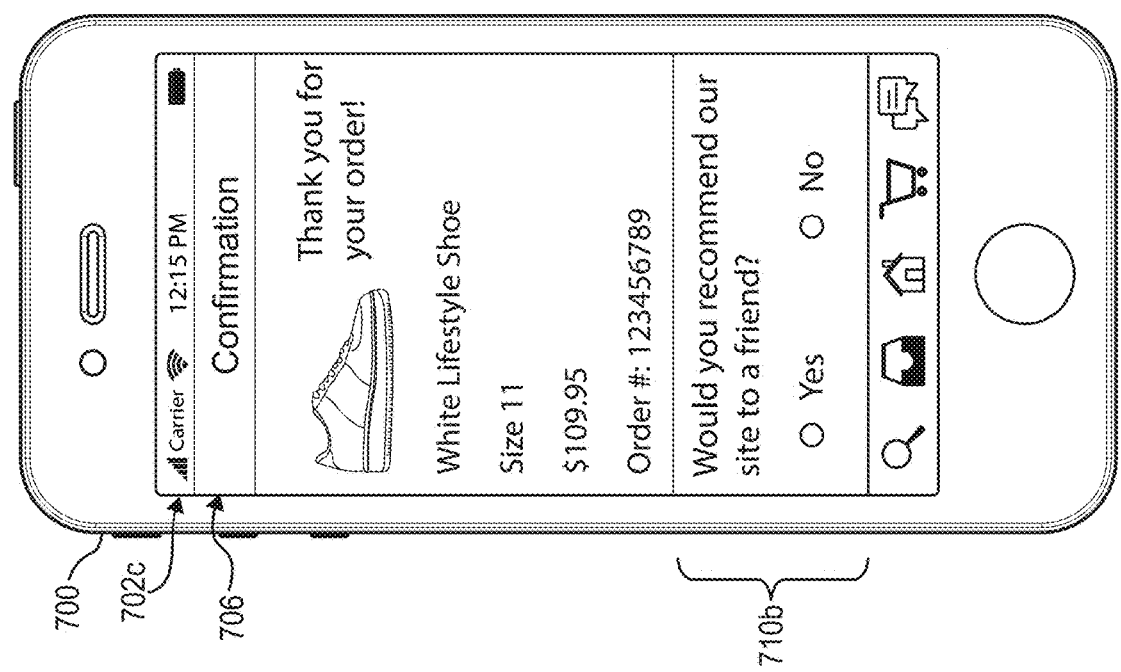

As mentioned above, the digital experience system 104 can operate across a variety of content experiences. To illustrate, FIGS. 7A-7C illustrate example graphical user interfaces for providing prompts to respondents within a mobile application content experience in accordance with one or more embodiments. For instance, FIGS. 7A-7C include a mobile respondent client device 700 (or simply "mobile device 700") that includes graphical user interfaces of a content experience 706.

As shown in FIG. 7A, a first graphical user interface 702a displays a feed page (i.e., interface) of the content experience 706 within a mobile application. The first graphical user interface 702a includes various elements such as a chat option 704 shown in a menu across the bottom of the first graphical user interface 702a. As mentioned above, a respondent can select the chat option 704 to initiate a messaging thread with a content provider agent. To illustrate, FIG. 7B shows a second graphical user interface 702b that includes a messaging thread between the respondent and a content provider agent.

As the respondent interacts with the content provider agent, the digital experience system 104 can detect a triggered touchpoint and provide a prompt, as described above. For example, as shown, the digital experience system 104 provides a first prompt 710a within the messaging thread 708 on the mobile device 700. Based on the first prompt 710a, the respondent can provide a response 712, which the digital experience system 104 collects and organizes, as previously described.

FIG. 7C shows a third graphical user interface 702c that displays a confirmation page (i.e., interface) of the content experience 706 within the mobile application. As shown, the third graphical user interface 702c includes a second prompt 710b, which the digital experience system 104 can provide to the respondent upon detecting a triggered touchpoint of an element within the confirmation page (or a previous page) of the content experience 706. In this manner, the digital experience system 104 integrates one or more prompts into the content experience 706 to further enhance the content experience 706 for the respondent.

As mentioned above, in one or more embodiments, the digital experience system 104 provides response feedback to respondents as part of a content experience. By providing response feedback, respondents feel validated and that their response to prompts are meaningful. Indeed, providing response feedback improves the "give-and-take" between the digital experience system 104 and respondents. Providing response feedback also leads to more valuable responses by respondents in the future.

Figure 8B:
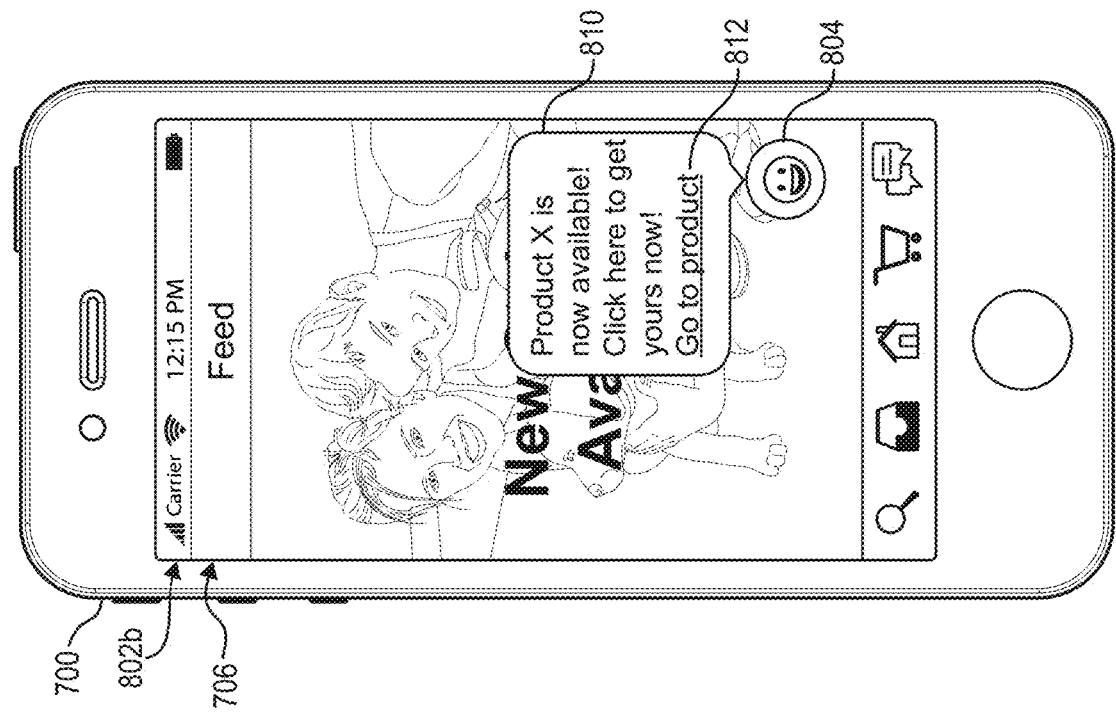
FIGS. 8A and 8B illustrate example graphical user interfaces for providing response feedback to a respondent within a content experience in accordance with one or more embodiments.
Figure 8A:
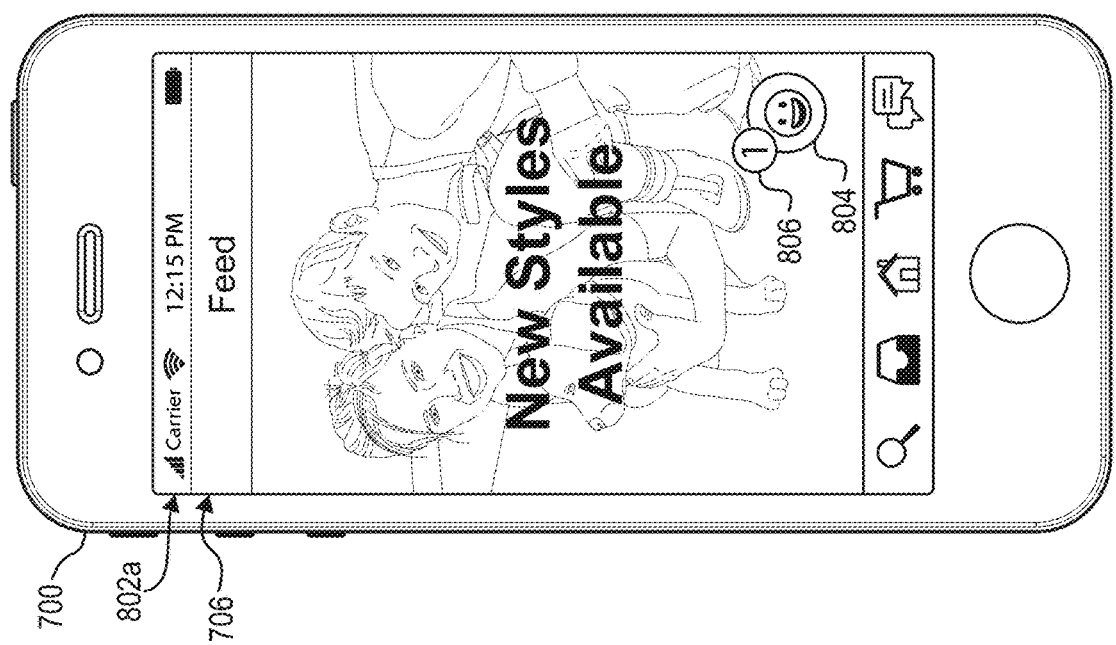

To illustrate, FIGS. 8A and 8B show example graphical user interfaces for providing response feedback to respondents within a content experience in accordance with one or more embodiments. For instance, FIGS. 8A and 8B include the mobile device 700 (e.g., a smartphone having a small screen) that includes a first graphical user interface 802a and a second graphical user interface 802b. The first graphical user interface 802a includes the feed page (i.e., the user interface) of the content experience 706 described above. In addition, the first graphical user interface 802a includes a notification element 804 and a notification badge 806 that signals an unread notification for the respondent.

Upon detecting the respondent selecting the notification element 804 (e.g., detecting a triggered touchpoint associated with the notification element 804), the digital experience system 104 provides a notification message to the respondent. For example, FIG. 8B illustrates a second graphical user interface 802b that includes a notification message 810. The notification message 810 indicates that a product which the respondent previously responded about (e.g., Product X) is in stock. Further, the notification message 810 includes a link 812 to directly navigate the user to a product page for Product X.

By using the link 812, the digital experience system 104 directly navigates the user to a product page for Product X in the proper application. In this manner, not only does the digital experience system 104 detect and provide a notification message 810 tailored to the small screen of the client device 700, but the digital experience system 104 also enables the respondent to navigate directly to a desired product with a single user interaction (e.g., click). Indeed, rather than having the respondent constantly navigate through numerous pages and menus to check to see when the desired product is in stock, the digital experience system 104 automatically surfaces the notification message 810 with direct access to the desired product (e.g., data of interest) upon the product becoming available.

While the second graphical user interface 802b displays a product availability notification, the notification message 810 can provide various versions of messages to the respondent. In particular, the notification message 810 can provide direct feedback to a previous response provided by the respondent when answering a prompt. For example, if the respondent previously reported a bug with the content experience 706, the notification message 810 can inform the user when the bug has been fixed. In some embodiments, the notification message 810 provides context and/or a link to the respondent's response.

As shown, the notification message 810 is shown as a pop-up bubble graphic. However, the digital experience system 104 and/or content provider can provide the notification message in a variety of formats within the content experience 706 (e.g., via different delivery methods). Additionally, or alternatively, the digital experience system 104 provides the notification message 810 to the respondent outside of the content experience 706 when the digital experience system 104 has contact information for the respondent (e.g., the digital experience system 104 stores a user profile and/or login for the respondent).

The digital experience system 104 can provide a notification message to a respondent immediately or upon the respondent subsequently accessing the content experience 706 based on the nature of the response. For example, if the respondent poses a question in a response to a prompt, the digital experience system 104 can detect and answer the question and provide a notification message to the respondent while the respondent is engaging with the content experience 706. In another example, when an issue in a response is addressed after the respondent's initial visit to the content experience 706, the digital experience system 104 can provide the notification message 810 to the respondent upon detecting that the respondent again accesses the content experience 706 at a subsequent time (e.g., either through a website or mobile application). For instance, the digital experience system 104 employs cookies, session variables, login information, or other tracking elements to detect when the respondent next visits the content experience.

In some embodiments, the digital experience system 104 determines that a threshold amount of time has elapsed since a notification message has become available for a respondent. After the threshold amount of time has elapsed, the digital experience system 104 can provide the notification message to the respondent using alternative media channels, such as push notification, email, text, electronic message, or social media. In some embodiments, the digital experience system 104 is unaware of a respondent's identity and cannot provide the notification message to a respondent's response to a prompt.

In additional embodiments, when providing response feedback to a user, the digital experience system 104 can follow up with an additional prompt. For example, the digital experience system 104 provides a prompt in connection with a notification message. In some embodiments, the prompt is from a previously employed template of prompts, such as a prompt not yet provided to the respondent. Alternatively, the prompt is from a new template of prompts.

In one or more embodiments, when a respondent raises an issue in a response to a prompt, the digital experience system 104 creates a customer service ticket (i.e., actionable item) to address the issue. When the issue is resolved or becomes irrelevant, the digital experience system 104 closes the customer service ticket. Each time a respondent accesses the content experience 706, the content experience can provide a notification message to the respondent that provides an update on the status of the issue (e.g., what is being done to resolve the issue).

When a respondent has an issue with the content experience 706, other respondents may share the same issue. Accordingly, the digital experience system 104 can group customer service tickets together based on common matters. Further, if the common matter is a bug or other issue, and the issue is resolved, then the digital experience system 104 can close the shared ticket and notify every respondent that addressed the issue in a response to a prompt. By linking tickets, the digital experience system 104 can reduce human resources, computational processing, and memory storage needed to address and store individual tickets with common matters.

In some embodiments, even when multiple issues from different respondents are grouped together in a customer service ticket, the digital experience system 104 can still individually notify respondents as they interact with the content experience 706. In particular, by providing response feedback to respondents on an individual level, each respondent receives the proper appreciation and value for responding to prompts and will continue to provide prompts in the future.

Figure 9:
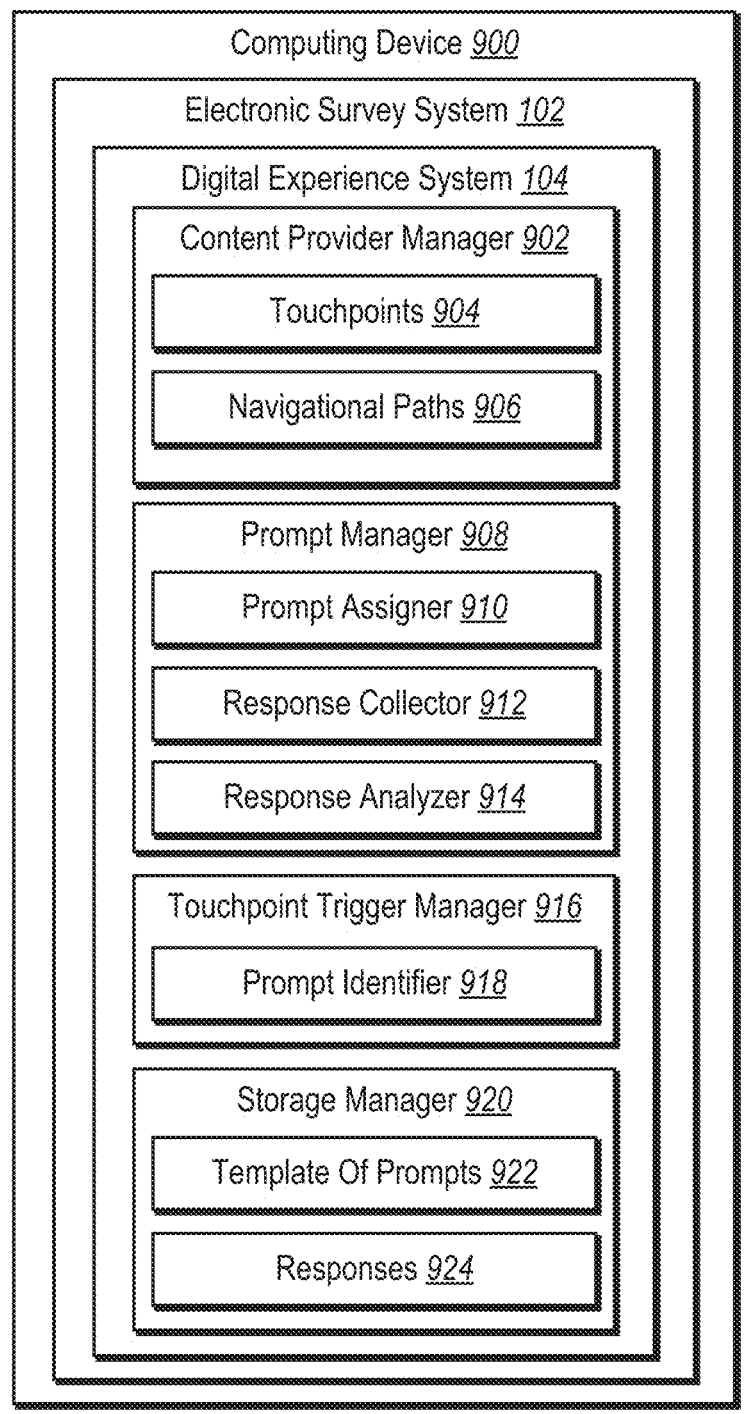
FIG. 9 illustrates a schematic diagram of the digital experience system in accordance with one or more embodiments.

Referring now to FIG. 9, additional detail will be provided regarding capabilities and components of the digital experience system 104 in accordance with one or more embodiments. In particular, FIG. 9 shows a schematic diagram of a digital experience system 104 hosted on a computing device 900. The digital experience system 104 can represent one or more embodiments previously described. For example, in some embodiments, the digital experience system 104 is implemented in the survey system 102 described above.

As shown, the digital experience system 104 is located on a computing device 900. In general, the computing device 900 is a non-mobile device, such as a desktop or server, or another type of client device. In other embodiments, the computing device 900 may represent various types of client devices, such as a mobile client device (e.g., a mobile telephone, a smartphone, a tablet, a laptop, etc.). Additional details with regard to the computing device 900 are discussed below as well as with respect to FIG. 11.

As illustrated in FIG. 9, the digital experience system 104 includes various components. For example, the digital experience system 104 includes a content provider manager 902, a prompt manager 908, a touchpoint trigger manager 916, and a storage manager 920. The content provider manager 902 includes touchpoints 904 and navigational paths 906. The prompt manager 908 includes a prompt assigner 910, a response collector 912, and a response analyzer 914. The touchpoint trigger manager 916 includes a prompt identifier 918. Also, the storage manager 920 includes a template of prompts 922 and responses 924.

As shown, the digital experience system 104 includes the content provider manager 902. In general, the content provider manager 902 communicates with a content provider of a content experience to facilitate the digital experience system 104 providing prompts and receiving responses to the prompts for respondents within the content experience. For example, the content provider manager 902 identifies touchpoints 904 associated with interfaces and elements of the content experience, as described above. Further, the content provider manager 902 can determine and/or establish touchpoint trigger conditions for the identified touchpoints, as explained earlier.

In addition, the content provider manager 902 can monitor the navigational paths 906 of respondents interacting with the content experience. For example, the content provider manager 902 provides listeners (e.g., code) to the content provider that indicate when a touchpoint is triggered by the interactions of respondents. Further, the content provider manager 902 can store other interactions of respondents within the navigational paths 906, as described above.

As illustrated, the digital experience system 104 also includes the prompt manager 908, which includes the prompt assigner 910, the response collector 912, and the response analyzer 914. In general, the prompt manager 908 facilitates the selection of prompts from a template of prompts 922 and the collection of responses to the prompts from respondents. To illustrate, the prompt assigner 910 determines which touchpoints within a content experience to assign a given prompt from the template of prompts 922. As described above, the prompt assigner 910 can assign prompt from the template of prompts 922 based on a variety of factors.

The response collector 912 can collect responses to prompts from respondents. In some embodiments, the response collector 912 organizes responses 924 to prompts and/or merges responses 924 to different versions of the same prompt from the same respondent. In addition, the response collector 912 can organize responses 924 by prompt (e.g., a prompt identifier) for each of the respondents (e.g., respondent identifier) that answer the prompt.

The response analyzer 914 evaluates responses to prompts from respondents. For example, the response analyzer 914 determines that a response indicates a modification request to the content experience, and, in response, modifies the content experience based on the modification request. Further, in some embodiments, the response analyzer 914 provides notifications to respondents that include response feedback, as described previously.

As shown, the digital experience system 104 also includes the touchpoint trigger manager 916 that includes the prompt identifier 918. Generally, the touchpoint trigger manager 916 detects when a touchpoint within the content experience is triggered by a respondent (e.g., the touchpoint trigger conditions are satisfied) and provides a prompt from the template of prompts 922. For example, upon determining that touchpoint trigger conditions for a touchpoint are satisfied, the prompt identifier 918 identifies and provides a prompt to a respondent client device to provide to the respondent. In some embodiments, the prompt identifier 918 can identify which prompt to provide in response to a triggered touchpoint when multiple prompts are assigned to a touchpoint, as explained earlier.

As illustrated, the digital experience system 104 also includes the storage manager 920 which includes the template of prompts 922 and responses 924 to prompts. As described earlier, the template of prompts 922 includes a list of prompts (e.g., questions) to ask respondents in connection with a content experience. The template of prompts 922 can include multiple versions of a prompt, as described earlier. Further, while not shown, the storage manager 920 can store multiple prompt templates.

Each of the components 902-924 of the digital experience system 104 can include software, hardware, or both. For example, the components 902-924 can include one or more instructions stored on a computer-readable storage medium and executable by processors of one or more computing devices, such as a client device or server device. When executed by the one or more processors, the computer-executable instructions of the digital experience system 104 can cause the computing device(s) to perform the feature learning methods described herein. Alternatively, the components 902-924 can include hardware, such as a special-purpose processing device to perform a certain function or group of functions. Alternatively, the components 902-924 of the digital experience system 104 can include a combination of computer-executable instructions and hardware.

Furthermore, the components 902-924 of the digital experience system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-924 may be implemented as a stand-alone application, such as a desktop or mobile application. Furthermore, the components 902-924 may be implemented as one or more web-based applications hosted on a remote server. The components 902-924 may also be implemented in a suite of mobile device applications or "apps."

Figure 10:
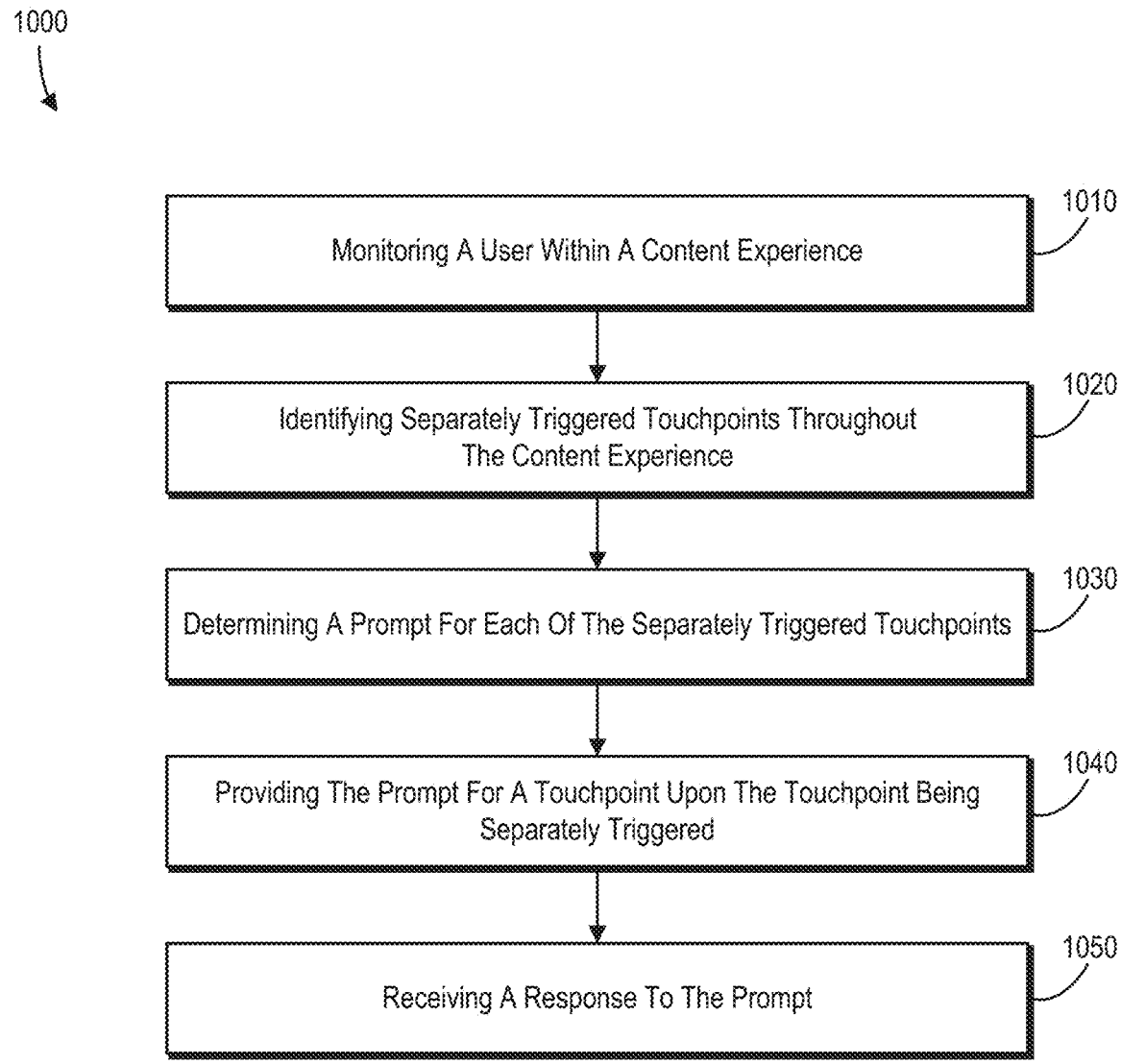
FIG. 10 illustrates a flowchart of a series of acts for providing touchpoint-specific prompts to a user throughout a content experience in accordance with one or more embodiments.

FIGS. 1-9, the corresponding text, and the examples provide a number of different methods, systems, devices, and non-transitory computer-readable media of the digital experience system 104 in accordance with one or more embodiments. In addition to the above description, one or more embodiments can also be described in terms of flowcharts including acts for accomplishing a particular result. For example, FIG. 10 illustrates flowcharts of an exemplary sequence of acts in accordance with one or more embodiments. FIG. 10 may be performed with more or fewer acts. Further, the acts may be performed in differing orders. Additionally, the acts described herein may be repeated or performed in parallel with one another or parallel with different instances of the same or similar acts.

While FIG. 10 illustrates series of acts according to particular embodiments, alternative embodiments may omit, add to, reorder, and/or modify any of the acts shown in FIG. 10. The series of acts of FIG. 10 can be performed as part of a method. Alternatively, a non-transitory computer-readable medium can comprise instructions, that when executed by one or more processors, cause a computing device to perform the series of acts of FIG. 10. In still further embodiments, a system can perform the acts of FIG. 10. In addition, in one or more embodiments, the series of acts 1000 is implemented on one or more computing devices, such as a server device 101 and/or computing device 900.

The series of acts 1000 includes an act 1010 of monitoring a user (e.g., respondent) within a content experience. In particular, the act 1010 can involve monitoring a navigational path of a user within a content experience that includes user interactions with the content experience. In one or more embodiments, the act 1010 includes detecting the interfaces and elements of the content experience with which the user interacted. In some embodiments, the content experience is a website that can include multiple web pages or a mobile application.

As shown, the series of acts 1000 also includes an act 1020 of identifying separately triggered touchpoints throughout the content experience. In particular, the act 1020 can involve identifying, based on the navigational path of the user, multiple discrete touchpoints throughout the content experience that were separately triggered by the user interactions. Indeed, the act 1020 can involve identifying multiple discrete touchpoints associated with interfaces and elements with which the user interacted while navigating through the content experience. In additional embodiments, a touchpoint is triggered when one or more touchpoint trigger conditions specified for the touchpoint are satisfied. In some embodiments, the multiple discrete touchpoints are associated with graphical elements, document pages, interfaces, navigational elements, or interactive features.

As shown in FIG. 10, the series of acts 1000 further includes an act 1030 of determining a prompt for each of the separately triggered touchpoints. In particular, the act 1030 can involve determining a prompt from a template of prompts for each of the separately triggered multiple discrete touchpoints. In some embodiments, the act 1030 also includes identifying metadata corresponding to the user interactions that triggered a touchpoint and customizing the prompt corresponding to the triggered touchpoint based on the metadata.

As shown, the series of acts 1000 also includes an act 1040 of providing the prompt for a touchpoint upon the touchpoint being separately triggered. In particular, the act 1040 can involve providing, throughout the content experience and in response to the multiple discrete touchpoints being separately triggered, the prompt for each of the separately triggered multiple discrete touchpoints. In one or more embodiments, the act 1040 includes detecting that the user triggered a touchpoint of the separately triggered touchpoints based on the user providing input that directly or indirectly interacts with the touchpoint, and, in some instances, detecting that the user interacted with a given sequence of touchpoints.

In some embodiments, the act 1040 also includes waiting, upon detecting the user triggering a touchpoint of the separately triggered touchpoints, a time period before providing the prompt corresponding to the triggered touchpoint to a client device associated with the user. In various embodiments, the act 1040 includes delaying providing the prompt for a touchpoint of the separately triggered touchpoints until a delay timer has elapsed, where the delay timer starts when a previous prompt based on a previously triggered touchpoint of the separately triggered touchpoints is provided.

In one or more embodiments, the act 1040 includes providing a subset of prompts from the template of prompts based on the navigational path of the user within the content experience. Indeed, the act 1040 can include providing more or less prompts from the template of prompts based on the level of interaction between the user and the content experience. In additional embodiments, the act 1040 includes displaying the prompt within a graphical element that appears upon providing the prompt and, in some cases, hiding the prompt upon the user responding to the prompt.

In some embodiments, the act 1040 includes determining that a prompt associated with a touchpoint of the separately triggered multiple discrete touchpoints has previously received a response, and providing an alternative version of the prompt for the touchpoint of the separately triggered touchpoints or providing an alternative prompt from the template of prompts for the touchpoint of the separately triggered multiple discrete touchpoints. In some embodiments, the act 1040 also includes providing a first version of the prompt based on the triggered touchpoint being a first touchpoint trigger type, and providing a second version of the prompt based on the triggered touchpoint being a second touchpoint trigger type.

In addition, the series of acts 1000 includes an act 1050 of receiving a response to the prompt. In particular, the act 1050 can involve receiving a response to the prompt for each of the separately triggered multiple discrete touchpoints. In one or more embodiments, the series of acts 1000 includes the act of generating the template of prompts to comprise a list of prompts to provide to users while navigating through the content experience, analyzing user navigational patterns of the content experience that identify triggered touchpoints between the users and the content experience, and associating each of the prompts in the template of prompts to one or more of the triggered touchpoints based on the user navigational patterns of the content experience.

The series of acts 1000 can also include a number of additional acts. In one or more embodiments, the series of acts 1000 includes the act of modifying the content experience based on the received responses. In addition, the series of acts 1000 can include the act of providing, based on modifying the content experience, response feedback to the user that indicates the modified content experience. In some embodiments, the response feedback is provided to the user upon the user subsequently accessing the content experience. In alternative embodiments, the response feedback is provided to the user via a communication sent to the user, such as an electronic message.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
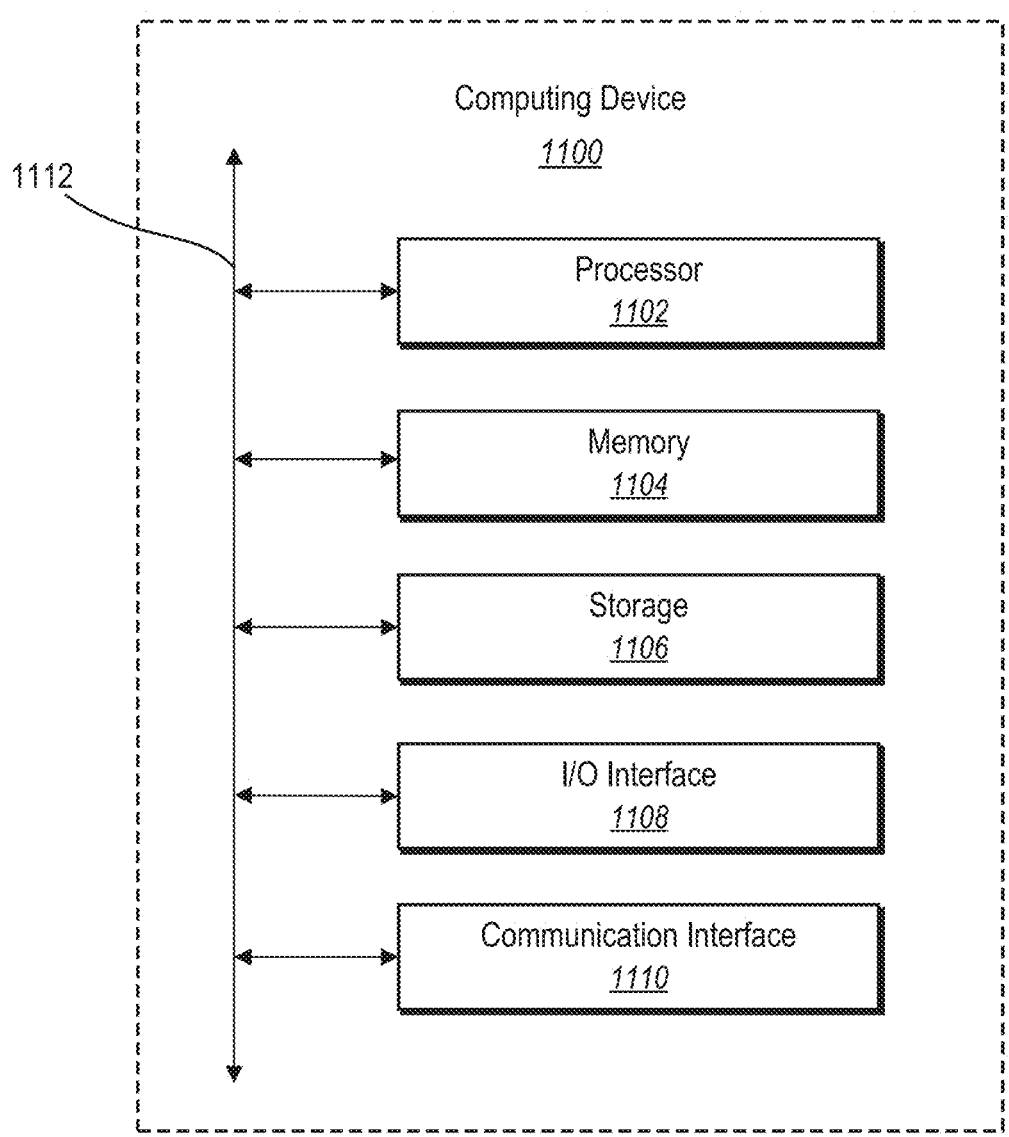
FIG. 11 illustrates a block diagram of an exemplary computing device for implementing one or more embodiments of the present disclosure.

FIG. 11 illustrates a block diagram of an exemplary computing device 1100 that may be configured to perform one or more of the processes described above. One will appreciate that one or more computing devices, such as the computing device 1100 may represent the computing devices described above (e.g., server devices 101, 108, client devices 106, 114, 200, 600, 700, and computing device 900). In one or more embodiments, the computing device 1100 may be a non-mobile device (e.g., a desktop computer or another type of client device). In some embodiments, the computing device 1100 may be a mobile device (e.g., a mobile telephone, a smartphone, a PDA, a tablet, a laptop, a camera, a tracker, a watch, a wearable device, etc.). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or simply "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

Figure 12:
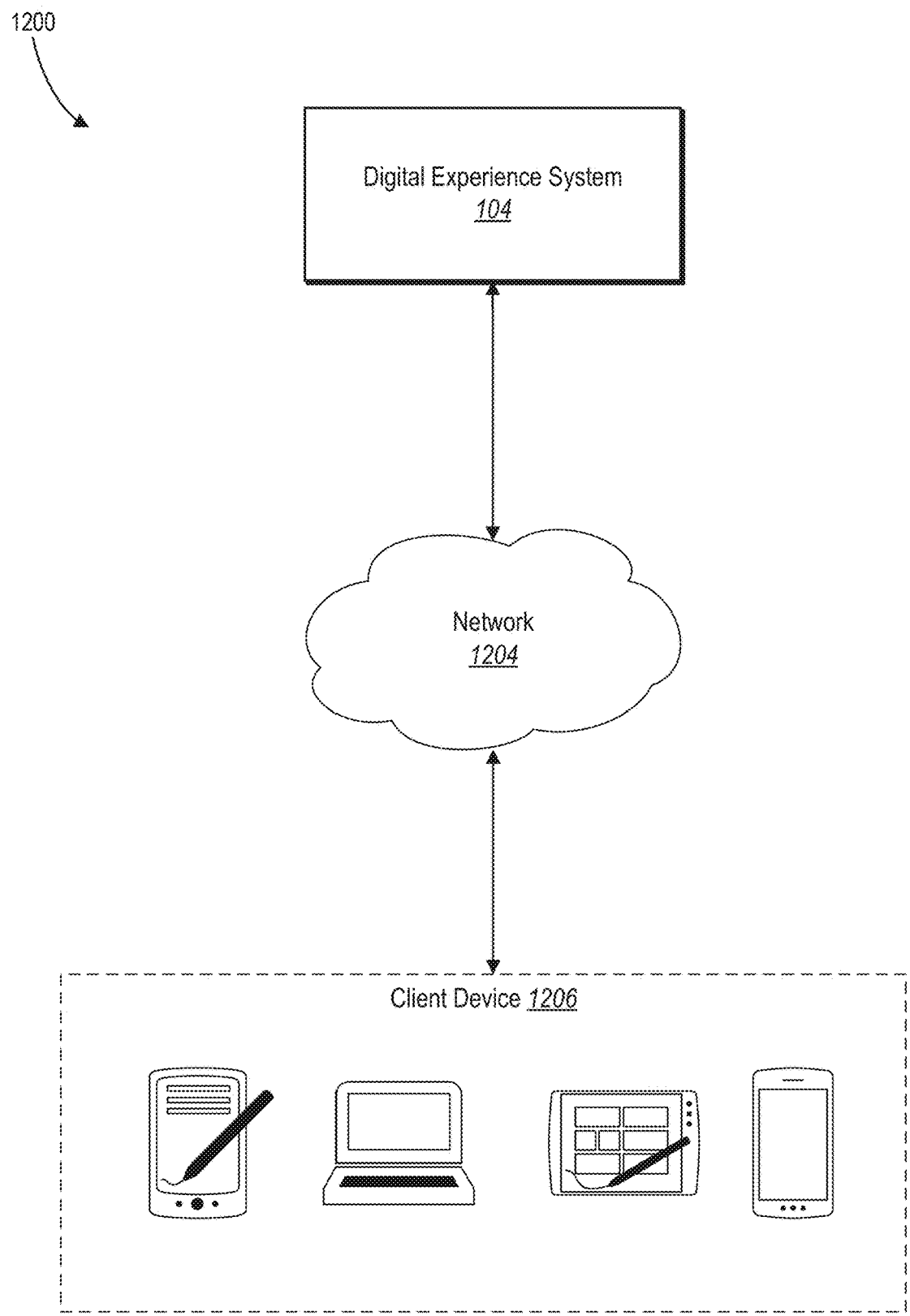
FIG. 12 illustrates an example network environment of a digital experience system in accordance with one or more embodiments described herein.

FIG. 12 illustrates an example network environment 1200 of a digital experience system 104, such as embodiments of the digital experience system 104 described herein. The network environment 1200 includes the digital experience system 104 and a client device 1206 connected to each other by a network 1204. Although FIG. 12 illustrates a particular arrangement of the digital experience system 104, the client device 1206, and the network 1204, one will appreciate that other arrangements of the network environment 1200 are possible. For example, a client device of the client device 1206 is directly connected to the digital experience system 104. Moreover, this disclosure contemplates any suitable number of client systems, digital experience systems, and networks are possible. For instance, the network environment 1200 includes multiple client systems.

This disclosure contemplates any suitable network. As an example, one or more portions of the network 1204 may include an ad hoc network, an intranet, an extranet, a VPN, a LAN, a wireless LAN, a WAN, a wireless WAN, a MAN, a portion of the Internet, a portion of the Public Switched Telephone Network (PSTN), a cellular telephone network, a safelight network, or a combination of two or more of these. The term "network" may include one or more networks and may employ a variety of physical and virtual links to connect multiple networks together.

In particular embodiments, the client device 1206 is an electronic device including hardware, software, or embedded logic components or a combination of two or more such components and capable of carrying out the appropriate functionalities implemented or supported by the client system. As an example, the client device 1206 includes any of the computing devices discussed above. The client device 1206 may enable a user at the client device 1206 to access the network 1204. Further, the client device 1206 may enable a user to communicate with other users at other client systems.

In some embodiments, the client device 1206 may include a web browser, such as and may have one or more add-ons, plug-ins, or other extensions. The client device 1206 may render a web page based on the HTML files from the server for presentation to the user. For example, the client device 1206 renders the graphical user interface described above.

In one or more embodiments, the digital experience system 104 includes a variety of servers, sub-systems, programs, modules, logs, and data stores. In some embodiments, digital experience system 104 includes one or more of the following: a web server, action logger, API-request server, relevance-and-ranking engine, content-object classifier, notification controller, action log, third-party-content-object-exposure log, inference module, authorization/privacy server, search module, user-targeting module, user-interface module, user-profile store, connection store, third-party content store, or location store. The digital experience system 104 may also include suitable components such as network interfaces, security mechanisms, load balancers, failover servers, management-and-network-operations consoles, other suitable components, or any suitable combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   receiving indications of user interactions with touchpoints within a content experience provided on a user device associated with a user;
   identifying, based on the indications of user interactions with the touchpoints, a sequence of touchpoints with which the user interacted;
   determining, by at least one processor, a prompt corresponding to the sequence of touchpoints;
   providing, for display on the user device, the prompt corresponding to the sequence of touchpoints; and
   receiving, from the user device, a response to the prompt corresponding to the sequence of touchpoints.

2. The method of claim 1, wherein identifying the sequence of touchpoints comprises determining that the user interacted with the touchpoints in a specific order based on the indications of user interactions with the touchpoints.

3. The method of claim 1, wherein identifying the sequence of touchpoints comprises determining that the touchpoints with which the user interacted comprise a minimum number of touchpoints based on the indications of user interactions with the touchpoints.

4. The method of claim 1, wherein identifying the sequence of touchpoints comprises determining that the user interacted with the touchpoints in a relaxed order based on the indications of user interactions with the touchpoints.

5. The method of claim 1, further comprising providing instructions to modify the content experience based on the response to the prompt.

6. The method of claim 1, wherein the content experience comprises a website or a mobile application.

7. The method of claim 1, further comprising:
   receiving, from an administrator device, touchpoint logic that defines the sequence of touchpoints;
   receiving, from the administer device, the prompt; and
   associating the sequence of touchpoints with the prompt.

8. A non-transitory computer readable medium storing instructions that, when executed by at least one processor, cause a computing device to:
   receive indications of user interactions with touchpoints within a content experience provided on a user device associated with a user;
   identify, based on the indications of user interactions with the touchpoints, a sequence of touchpoints with which the user interacted;
   determine a prompt corresponding to the sequence of touchpoints;
   provide, for display on the user device, the prompt corresponding to the sequence of touchpoints; and
   receive, from the user device, a response to the prompt corresponding to the sequence of touchpoints.

9. The non-transitory computer readable medium of claim 8, wherein identifying the sequence of touchpoints comprises determining that the user interacted with the touchpoints in a specific order based on the indications of user interactions with the touchpoints.

10. The non-transitory computer readable medium of claim 8, wherein identifying the sequence of touchpoints comprises determining that the touchpoints with which the user interacted comprise a minimum number of touchpoints based on the indications of user interactions with the touchpoints.

11. The non-transitory computer readable medium of claim 8, wherein identifying the sequence of touchpoints comprises determining that the user interacted with the touchpoints in a relaxed order based on the indications of user interactions with the touchpoints.

12. The non-transitory computer readable medium of claim 8, further comprising instructions that, when executed by the at least one processor, cause the computing device to provide instructions to modify the content experience based on the response to the prompt.

13. The non-transitory computer readable medium of claim 8, wherein the content experience comprises a website or a mobile application.

14. The non-transitory computer readable medium of claim 8, further comprising instructions that, when executed by the at least one processor, cause the computing device to:
receive, from an administrator device, touchpoint logic that defines the sequence of touchpoints;
receive, from the administer device, the prompt; and
associate the sequence of touchpoints with the prompt based on the touchpoint logic.

15. A system, comprising:
at least one processor; and
a non-transitory computer readable storage medium comprising instructions that, when executed by the at least one processor, cause the system to:
receive indications of user interactions with touchpoints within a content experience provided on a user device associated with a user;
identify, based on the indications of user interactions with the touchpoints, a sequence of touchpoints with which the user interacted;
determine a prompt corresponding to the sequence of touchpoints;
provide, for display on the user device, the prompt corresponding to the sequence of touchpoints; and
receive, from the user device, a response to the prompt corresponding to the sequence of touchpoints.

16. The system of claim 15, wherein identifying the sequence of touchpoints comprises determining that the user interacted with the touchpoints in a specific order based on the indications of user interactions with the touchpoints.

17. The system of claim 15, wherein identifying the sequence of touchpoints comprises determining that the touchpoints with which the user interacted comprise a minimum number of touchpoints based on the indications of user interactions with the touchpoints.

18. The system of claim 15, wherein identifying the sequence of touchpoints comprises determining that the user interacted with the touchpoints in a relaxed order based on the indications of user interactions with the touchpoints.

19. The system of claim 15, further comprising instructions that, when executed by the at least one processor, cause the system to provide instructions to modify the content experience based on the response to the prompt.

20. The system of claim 15, further comprising instructions that, when executed by the at least one processor, cause the system to:
receive, from an administrator device, touchpoint logic that defines the sequence of touchpoints;
receive, from the administer device, the prompt; and
associate the sequence of touchpoints with the prompt based on the touchpoint logic.

* * * * *